United States Patent
Shin et al.

(10) Patent No.: US 11,180,154 B2
(45) Date of Patent: Nov. 23, 2021

(54) FINGERPRINTING DRIVERS BASED ON VEHICLE TURNS

(71) Applicant: The Regents of The University of Michigan, Ann Arbor, MI (US)

(72) Inventors: Kang G. Shin, Ann Arbor, MI (US); Dongyao Chen, Ann Arbor, MI (US); Kyong-Tak Cho, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 565 days.

(21) Appl. No.: 16/162,699

(22) Filed: Oct. 17, 2018

(65) Prior Publication Data

US 2019/0111934 A1    Apr. 18, 2019

Related U.S. Application Data

(60) Provisional application No. 62/573,274, filed on Oct. 17, 2017.

(51) Int. Cl.
*B60W 40/09*     (2012.01)
*B60W 40/08*     (2012.01)

(52) U.S. Cl.
CPC ..... *B60W 40/09* (2013.01); *B60W 2040/0809* (2013.01); *B60W 2520/14* (2013.01); *B60W 2540/18* (2013.01); *B60W 2540/30* (2013.01)

(58) Field of Classification Search
CPC .............. B60W 40/08; B60W 40/09; B60W 2540/043; B60W 2540/18; B60W 2540/30
See application file for complete search history.

(56) References Cited

U.S. PATENT DOCUMENTS

| | | | |
|---|---|---|---|
| 6,397,136 B1 | 5/2002 | Breed et al. | |
| 6,445,988 B1 | 9/2002 | Breed et al. | |
| 9,383,209 B2 | 7/2016 | Bhardwaj et al. | |
| 9,834,222 B2 | 12/2017 | Shin et al. | |
| 2010/0023197 A1* | 1/2010 | Huang | B60W 40/09 701/31.4 |
| 2014/0180730 A1* | 6/2014 | Cordova | G06Q 40/08 705/4 |
| 2015/0191178 A1* | 7/2015 | Roy | H04W 4/027 701/36 |
| 2015/0235485 A1* | 8/2015 | Nemat-Nasser | B60W 40/09 701/1 |
| 2016/0129916 A1 | 5/2016 | Olsen | |

(Continued)

OTHER PUBLICATIONS

M. Enev et al "Automobile Driver Fingerprinting", Proceedings on Privacy Enhancing Technologies Jan. 2016. (2016).

(Continued)

*Primary Examiner* — Peter D Nolan
*Assistant Examiner* — Ce Li Li
(74) *Attorney, Agent, or Firm* — Harness, Dickey & Pierce, P.L.C.

(57) ABSTRACT

Driver fingerprinting using sensor data was known to be feasible only with access to in-car data. This disclosure presents a novel technique for identifying a vehicle driver from only one vehicle turn and using zero-permission sensors residing in the mobile device. Through extensive evaluations, extracted features are shown to reflect only the drivers unique turning style and thus functions as the core of driver fingerprinting.

17 Claims, 15 Drawing Sheets

(56) References Cited

U.S. PATENT DOCUMENTS

| | | | |
|---|---|---|---|
| 2017/0061812 A1* | 3/2017 | Lahav | G09B 9/042 |
| 2017/0174221 A1* | 6/2017 | Vaughn | G05D 1/021 |
| 2017/0366945 A1* | 12/2017 | Uliyar | G01S 19/51 |
| 2018/0182185 A1* | 6/2018 | Tong | G06Q 10/20 |
| 2018/0237026 A1* | 8/2018 | Chowdhury | G07C 5/008 |
| 2018/0259956 A1* | 9/2018 | Kawamoto | B60W 50/0098 |
| 2018/0270241 A1* | 9/2018 | Herrmann | B62D 15/021 |

OTHER PUBLICATIONS

D. Hallac, et al., "Driver Identification Using Automobile Sensor Data From A Single Turn", Intelligent Transportation Systems (ITSC), 2016 IEEE 19th International Conference on IEEE, (2016).

A. Burton et al., "Driver Identification and Authentication With Active Behavior Modeling", Network and Service Management (CNSM), 2016 12th International Conference on, IEEE, (2016).

X. Meng, et al., "An Intelligent Vehicle Security System Based On Modeling Human Driving Behaviors", In ISNN'06m. Springer-Verlag (2006).

D. Johnson, et al., "Driving Style Recognition Using A Smartphone As A Sensor Platform", In ITSC, 2011 14th International IEEE Conference. (2011).

H. Eren, et al., "Estimating Driving Behavior By A Smartphone"., In IV, 2012 IEEE (2012).

M. Van Ly et al., "Driver Classification and Driving Style Recognition Using Inertial Sensors"., In IV. IEEE (2013).

\* cited by examiner

FINGERPRINTING DRIVERS BASED ON VEHICLE TURNS

CROSS-REFERENCE TO RELATED APPLICATIONS

This application claims the benefit of U.S. Provisional Application No. 62/573,274, filed on Oct. 17, 2017. The entire disclosure of the above application is incorporated herein by reference.

FIELD

The present disclosure relates to techniques for identifying a driver of a vehicle.

BACKGROUND

As data of vehicle maneuver becomes abundant for assisted or autonomous driving, their implication of privacy invasion/leakage has become an increasing concern. To prevent potential privacy violations, the U.S. Congress has enacted a law for enforcing driving data privacy in December 2015. In particular, the law forbids disclosure of personally identifiable information of the owner or the lessee of the vehicle. In December 2016, NHTSA also enforced the protection of any data that can be "reasonably linkable" to driver identification.

Despite these legislations, researchers have demonstrated that driver's privacy can indeed be breached by accessing in-vehicle data through an On-Board Diagnostics (OBD-II) dongle. For example, researchers have shown that the driver's identity can be revealed by analyzing the vehicle's Controller Area Network (CAN) data collected through the OBD-II port. Although this could be a severe privacy threat, its practicability/feasibility has been questioned for two reasons. First, due to security concerns, car manufacturers are beginning to restrict the OBD-II port access, i.e., allowing its access only during diagnostics (and while the vehicle is parked). Second, even with OBD-II access, existing driver-fingerprinting schemes require a time-consuming task of reverse engineering in-vehicle data. All of these together make it very difficult to invade the driver's privacy via the OBD-II port.

Due to the nature of in-vehicle data being obscure and difficult to access (e.g., physical access to one's car), researchers/developers increasingly use inertial measurement units (IMUs)—available on various devices, such as smartphones, OEM-authorized OBD-II dongles, and wearables—as an alternative source of driving data for enhancing driving experience and safety. This use of IMUs in the automotive ecosystem has led to the development of various "beneficial" (c.f. malicious) applications such as driving-assistance systems, adjustable auto insurance, and fuel-efficient navigations.

Collection and exploitation of IMU data also create concerns of breaching drivers' privacy. In particular, data collection entities might be able to infer the driver's identity from the collected IMU data, leading to an incontrovertible breach of the driver's privacy. This disclosure focuses on the driver's identity privacy, and hence questions "Would existing schemes on mobile devices breach the driver's privacy? Can an adversary with access to only IMU data achieve it?" On one hand, researchers have shown that one's privacy can be breached if his/her device is identified/tracked via stealthy identifiers available on the device. For example, by leveraging the imperfection of IMU components or non-cookie web tracking techniques (e.g., supercookies) on a mobile device, an adversary can identify the device and/or its user. On the other hand, instead of identifying the device itself (and hence its owner), other existing schemes attempt to identify the user through his/her behavior or interaction with the device (e.g., touch screen behavior, DNS traffic pattern). Although these existing schemes indeed breach privacy of the device owner/user, they do not necessarily breach the actual driver's privacy. For example, suppose driving data was collected from a smartphone while its owner was in a car as a passenger. In such a case, the collected data did not originate from the actual driver's device, and hence will not help identify the driver. Similarly, existing schemes cannot identify the driver when someone simply takes his phone and then goes for a drive. Meanwhile, an interesting but yet unanswered question is "if an adversary reads and analyzes the IMU data in more depth, would the consequences be different?" Behind the paradigm shift of how devices (equipped with IMUs) are being used/integrated in contemporary automotive ecosystems (e.g., vehicle authentication via smartphones, event data recording via IMUs), there could exist many uncovered scenarios where the driver's privacy could be unintentionally breached.

Against this backdrop, it is desirable to develop a system and techniques for identifying a vehicle driver using data captured by a mobile device (referred to herein as Dri-Fi or driver fingerprint method).

This section provides background information related to the present disclosure which is not necessarily prior art.

SUMMARY

This section provides a general summary of the disclosure, and is not a comprehensive disclosure of its full scope or all of its features.

A method is presented for identifying a driver of a vehicle. In one aspect, the method includes: receiving, by a processor of a mobile device, a signal from a rotational rate sensor residing in the mobile device while the vehicle is being driven by a given driver, where the signals are indicative of angular speed about a yaw axis of the vehicle; storing a plurality of fingerprints in a data store accessible to the processor, where each fingerprint in the plurality of fingerprints corresponds to a driver of the vehicle and is indicative of a turn made by the driver; identifying, by the processor, a turn by the vehicle based on the received signal and a change in direction of travel by the vehicle; extracting one or more features from the received signal and thereby forming a new fingerprint indicative of the turn made by the given driver, wherein the one or more features includes acceleration along an end-of turn axis during the turn as a first feature, a difference between successive acceleration values along the end-of turn axis as a second feature and a difference between measurements from the rotational rate sensor during the turn as a third feature, where a start-of-turn axis is defined in direction the vehicle is travelling at start of the turn and the end-of-turn axis is defined orthogonal to the start-of-turn axis; comparing, by the processor, the new fingerprint to the plurality of fingerprints; and identifying the given driver of the vehicle based on the comparison of the new fingerprint to the plurality of fingerprints.

In another aspect, the driver identification method includes: receiving, by a processor of a mobile device, a signal from a rotational rate sensor residing in the mobile device while the vehicle is being driven by a given driver, where the signals are indicative of angular speed about a yaw axis of the vehicle; storing a plurality of fingerprints in a data store accessible to the processor, where each fingerprint in the plurality of fingerprints corresponds to a driver of the vehicle and is indicative of a turn made by the driver; monitoring, by the processor, a change in direction of travel by the vehicle; detecting, by the processor, a vehicle maneuver made by the vehicle from the received signal; identifying, by the processor, a turn by the vehicle based on the received signal and a change in direction of travel by the vehicle; determining, by the processor, a start time and an end time for the identified turn in the received signal; extracting one or more features using a portion of the received signal between the start time and the end time and thereby forming a new fingerprint indicative of the turn made by the given driver; comparing, by the processor, the new fingerprint to the plurality of fingerprints; and identifying the given driver of the vehicle based on the comparison of the new fingerprint to the plurality of fingerprints.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
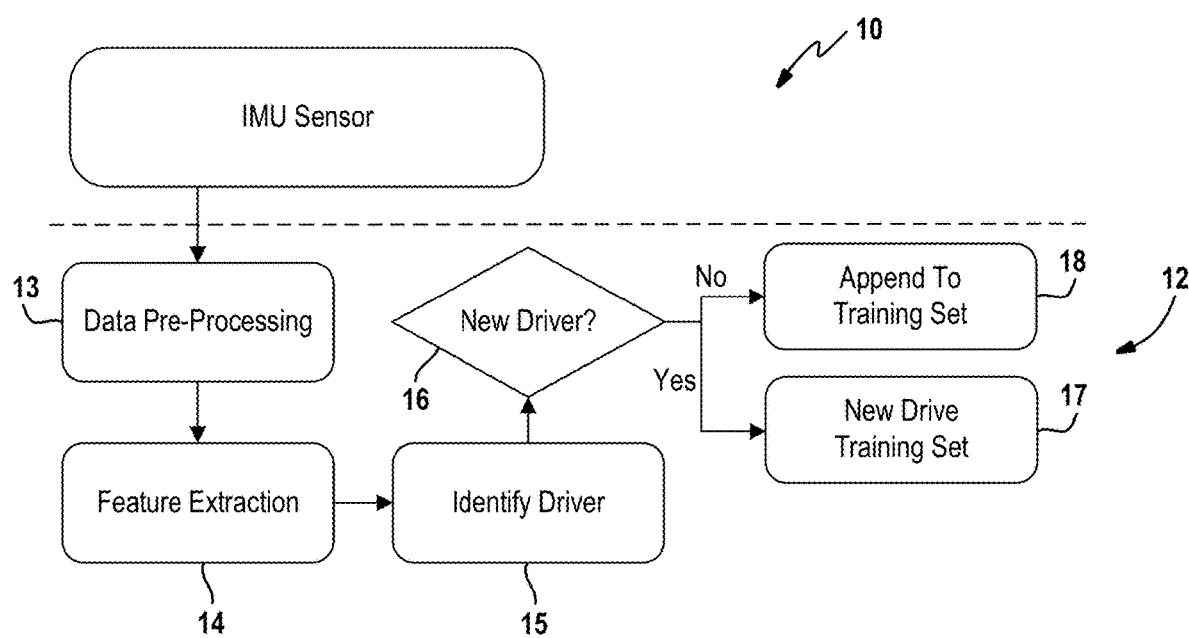
FIG. 1 is a diagram showing a system overview.

Example embodiments will now be described more fully with reference to the accompanying drawings.

An adversary with access to sensors on an in-vehicle network, such as the Controller Area Network (CAN), can fingerprint the driver. Despite the rich and low-noise in-car data for the adversary to fingerprint drivers, s/he must meet the following two minimum requirements to acquire the data, which are assumed to have been met in all existing studies.

To read and extract values of sensors on an in-vehicle network, the adversary must have access to the sensors data. To gain such an access, s/he may either 1) remotely compromise an Electronic Control Unit (ECU), or 2) have a compromised OBD-II dongle plugged in the victim's vehicle in order to read in-car data. For the first case, however, depending on the ECU that the adversary compromised, s/he may not be able to read all sensors data of interest, mainly because the ECUs which produce those data may reside in different in-vehicle networks (e.g., some on high-speed CAN and others on low-speed CAN). For the second case, the adversary has indeed control of a plugged-in and compromised OBD-II dongle, and therefore, in contrast to a compromised ECU, is likely to have access to all sensors data of interest. However, for security reasons, car manufacturers are increasingly blocking/restricting in-car data access through the OBD-II port except when the vehicle is parked. Thus, the adversary will less likely be able to access in-car data.

Even when the adversary has access to in-vehicle network messages, s/he must still (i) understand where and in which message the sensor data (of interest) is contained, and (ii) translate them into actual sensor values (e.g., transformation coefficients for addition/multiplication of raw sensor data). In-vehicle network messages are encoded by the vehicle manufacturers and the "decoding book," which allows one to translate the raw data is proprietary to them. Therefore, unless the adversary has access to such a translator, s/he would have to reverse-engineer the messages, which is often painstaking and incomplete.

Although the adversary may have abundant resources to fingerprint the driver, meeting the above two requirements may be difficult or even not possible.

Due to the difficulty and (even) impracticality of an adversary fingerprinting the driver via in-vehicle (CAN-bus) data, one can consider the following adversary who might fingerprint the driver without the difficulties of state-of-the-art solutions. In particular, one can consider the adversary with a data-collection entity that aims to fingerprint the driver based on zero permission mobile IMU data. Assume that the adversary has access to the target's mobile IMU data while s/he was driving. As mobile IMUs are available in various commodity mobile/wearable devices, such as smartphones, watches, and even in OBD-II dongles, the adversary can compromise one of them (belonging to the target), and obtain the required IMU data for driver fingerprinting. This means that the adversary would have a much larger attack surface than existing driver fingerprinting schemes. One example of such an adversary would be a smartphone malware programmer who builds an app to stealthily collect the target's IMU data. Another example could be a car insurance company that might reveal information other than what was initially agreed on via the collected/stored IMU data available on its OBD-II dongles.

Integrating mobile IMU sensors with the automotive ecosystem can, on one hand, lead to development of numerous beneficial apps. On the other hand, it may violate the driver's privacy. Three double-edged-sword scenarios are presented, which at first glance seem beneficial for our daily driving experience but could lead to a severe privacy violation; in fact, more severe than what has already been studied/uncovered.

First, vehicle authentication. To enable a more convenient car-sharing experience, car companies, such as Volvo and Tesla, started to let car owners unlock and start their cars (e.g. new Tesla model 3) by using their smartphone apps, thus replacing a key fob with a smartphone. By installing this authorized app, the car owner first designates eligible drivers as a whitelist. All allowed drivers can then unlock and start the car with authentication through the Bluetooth link between the car and their smartphones.

A privacy violation case corresponding to the first scenario. Alice owns a car with this functionality. Her husband Bob's driver's license was suspended. So, Alice is unable to register him as a driver in the whitelist, due to a background check conducted by the car company. One day, Alice asks Bob to drive the car for some reasons. To evade the driver authentication, Alice temporarily gives Bob her phone to drive the car. However, if the car company's app had stored IMU data and thus had the driving profiles of all whitelisted drivers, with the capability of identifying the driver from IMU data, the car company can determine that the current driving pattern (which is Bob's) does not match with any of the whitelisted. This becomes a definite privacy violation if the car company had initially stated/claimed that all the IMU data (while driving) reveals how the car moves, not who actually drives it. However, the driver's identity can be found via an in-depth analysis.

Second, named driver exclusion. Many states in the U.S. permit "named driver exclusion" to allow auto insurance buyers to reduce their premium. Under this plan, the insurance company will not accept any excuses for allowing the excluded person to drive. Therefore, Department of Motor Vehicles (DMV) specifically warns all drivers of the fact that, to avoid driving without any insurance coverage, the excluded individuals should not drive the insuree's car.

A privacy violation case corresponding to the second scenario. Suppose Bob's wife, Alice, is a legitimate driver. However, to reduce the cost of their family insurance plan, Bob excludes Alice from the plan. Bob's smartphone has installed the insurance company's app, which not only manages his insurance account but also keeps a record of the driving IMU data as an Event Data Recorder (EDR).3 One night, Bob was in a bad physical condition and hence asked Alice to drive him home. Unfortunately, they ran into an incident. At the court, the insurance company defended itself by showing the driving IMU data—measured during that night when the accident occurred—matched Alice's, not Bob's, driving profile. Thus, the company refused to reimburse Bob and won the lawsuit. Note that the initial purpose of EDR functionality on the app was not for driver fingerprinting but for recording events, an undetermined privacy violation.

Third, utilization of IMU Data. Unlike conventional OBD-II dongles (designed for diagnostics), car manufacturers are designing and developing a new type of dongle, which does not provide users with raw CAN data but provides them in a "translated" format (e.g., JSON format). Ford OpenXC and Intel-based OBD-II dongles are examples of such a design. This way, the car OEMs' plugged-in dongle reads and translates metrics from the car's internal network and provides them to the user without revealing proprietary information. Thus, while providing the necessary information to the users, car OEMs can let them install vehicle-aware apps which have better interfaces based on a context that can minimize distraction while driving.

A privacy violation case corresponding to the third scenario is as follows. Alice has the car OEM's dongle, which provides her the translated CAN data, plugged in her car so that she can gain more insight into her car operation. Due to a security breach on the dongle, suppose Mallory has access to the data being read from the dongle, but only in a translated format. Note that even with access to raw CAN data, Mallory would still need to reverse engineer the messages; we are relaxing the technical requirements for Mallory. He may fail because the translated data that Mallory has access might not contain the required information for in-car-data-based driver fingerprinting. Note that the most significant feature used for driver fingerprinting in previous works was the brake pedal position, which unfortunately is not provided by the Ford OpenXC. However, since those dongles are always equipped with IMUs for data calibration, Mallory uses his malware to read the IMUs instead, and thus attempts to identify the driver. This implies that Mallory might not even need to access the translated data at all, thus lowering the technical barrier for the adversary. Through security by obscurity, the translation of data itself might provide some sort of privacy. However, the IMUs installed on those dongles, designed for calibration, might ironically threaten the driver's privacy.

To breach the driver's privacy, the adversary needs an efficient way of fingerprinting the driver solely based on IMU data. Researchers have already demonstrated the feasibility of an adversary breaching the driver's privacy by fingerprinting him/her with in-car data. One can refer to such an adversary as a high-resource adversary due to his/her access to the rich and low-noise in-car data. However, it is still not known if a low-resource adversary, with access to only the target's IMU data, can fingerprint the driver; it may even be infeasible due to his/her insufficient resources. Therefore, the goal is to shed light on an unexplored but important question: "Within a short duration, can a low-resource adversary fingerprint the driver, i.e., having access to only IMUs?"

FIG. 1 presents an overview of an example system 10 for identifying a driver of a vehicle. Recall that mobile IMU sensors are commonly available on various devices and are very easy to access. For example, if the victim installed a compromised smartphone app controlled by an adversary, the adversary can acquire IMU measurements with zero-permission and then upload the acquired data to his own server. While reference is made specifically to an IMU sensor 11, it is readily understood that the techniques described herein are applicable more generally to different types of rotational rate sensors, including but not limited to gyroscopes, accelerometers or combinations thereof.

Once the adversary acquires the required sensor data, a controller 12 in the system first pre-processes the raw IMU sensor data at 13 to remove noises and extracts sensor measurements from only those obtained while the victim is making a left/right turn. Next, based on the pre-processed data, the controller 12 constructs a feature vector at 14 and exploits them as inputs for machine classifiers. As a result, the adversary fingerprints the driver at 15. Last, the adversary verifies whether the detected driver is someone who is within his training dataset (used for classification), i.e., one of the existing drivers which he had learned about. If not, he constructs a new driver training dataset 17 for that driver; otherwise, the newly acquired data is merged with one of the existing training datasets 18.

Figure 2:
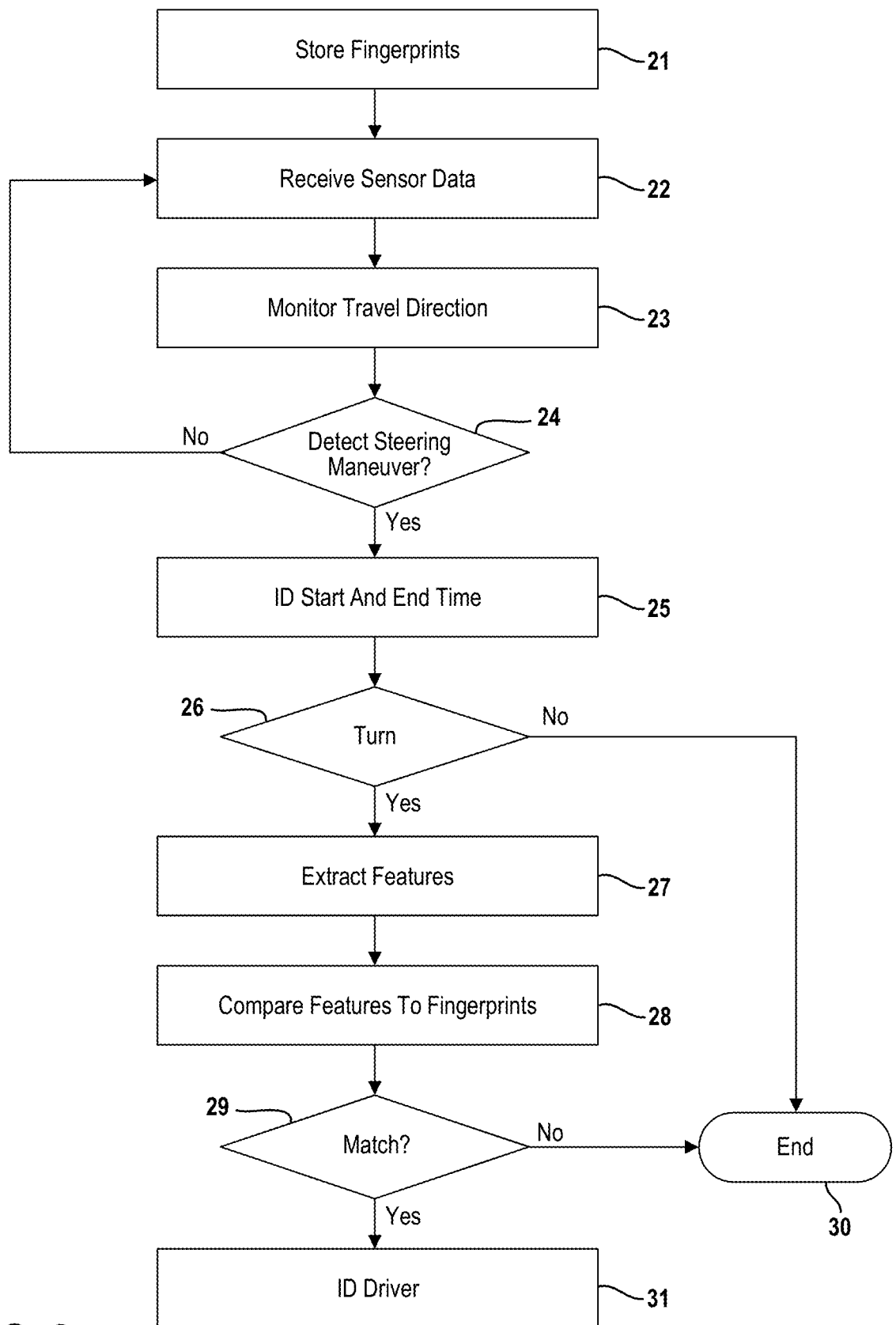
FIG. 2 is a flowchart depicting an example embodiment of a method for identifying a driver of a vehicle.

FIG. 2 further illustrates an example embodiment of the method for identifying the driver of a vehicle. As a starting point, one or more fingerprints are stored at 21 in a data store accessible to a computer processor of a mobile device. Each fingerprint corresponds to a driver of the vehicle and is indicative of a turn made by the driver. Nature of the fingerprints will be further described below. Although not limited thereto, it is understood that the method is implemented on a mobile device, including but not limited to a mobile phone, a watch, an activity tracker or a personal medical device.

As indicated at 22, the system continuously collects/receives sensor data from a rotational rate sensor residing in the mobile device. At least one the signals received by the processor is indicative of angular speed about a yaw axis of the vehicle. To accommodate different postures of the mobile device inside the car, the system performs a coordinate alignment of the sensor readings, for example using a magnetometer. Specifically, the system always aligns the device's coordinate with the geo-frame/earth coordinate so as to maintain the consistency of analysis. This allows the data which the system uses for driver fingerprinting to be not affected by the device postures, i.e., works under various placements/circumstances.

Figure 3:
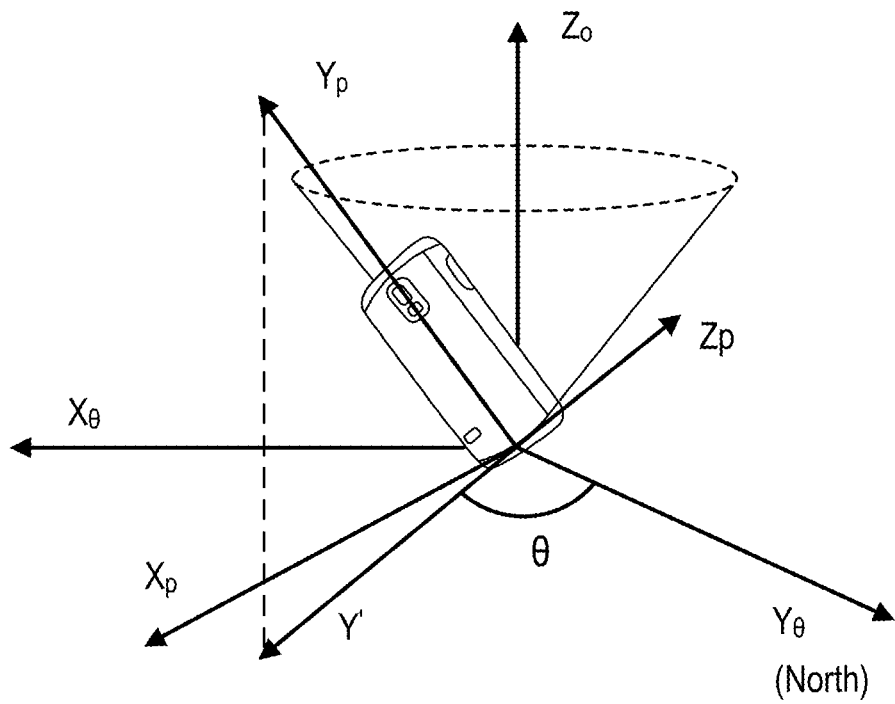
FIG. 3 is a diagram illustrating alignment of a phone coordinate system with a geo-frame coordinate system.

FIG. 3 illustrates one technique for aligning the phone coordinates ($\{X_p, Y_p, Z_p\}$), with the geo-frame coordinates ($\{X_e, Y_e, Z_e\}$). This allows one to simplify the change of the readings from three degrees of freedom (DoFs) to one DoF. The key idea is that with the measurements of the direction of the applied gravity to the mobile phone (Y), the phone coordinate can be fixed within a cone. Combining the result with the angle ($\theta$) derived from the magnetometer readings and the thus-determined rotation matrix, the phone coordinate can be aligned with the geo-frame coordinate. Further details regarding this example technique are described by P. Zhou et al in "Use it free: Instantly knowing your phone attitude" In *Proc of ACM Mobicom* (2014). Other alignment techniques also fall within the scope of this disclosure.

Returning to FIG. 2, once the coordinate-aligned data of the gyroscope and accelerometer sensors have been collected, the system smooths and trims the data for further analyses. If the portable device is a phone, its handling by the user may cause high-power noises on the gyroscope and accelerometer sensors. Abnormal road conditions (e.g., potholes) may incur similar noise level as well. Therefore, the system first removes those noises by filtering out abnormal spikes in the data. Then, the system smooths each data stream (e.g., from gyroscope and accelerometer) using a low-pass filter to remove high-frequency noises.

In the example embodiment, the system trims the smoothed data further by retaining the measurements acquired only during a left/right turn. In other words, measurements from when the driver constantly drove on a straight road, or when the car stopped to wait for traffic lights or stop signs are all discarded. Among the various maneuvers (e.g., turns, lane changes, acceleration/deceleration), the reason for focusing on data from left and right turns is that when making them, the vehicle/driver's actions/maneuvers are much less likely to be affected by the car in front (i.e., traffic) than other vehicle maneuvers. For example, deceleration of a vehicle would depend on the car in front; whereas, left/right turns are less likely to depend on such influences.

In order to extract data related to left or right turns, the system monitors the direction of travel by the vehicle at 23 as well as detects a steering maneuver made by the vehicle at 24. Measurements of the vehicle's instantaneous velocity may be used to detect a change in the direction of travel. Two ways of acquiring velocity with a mobile device are exploiting the IMU sensor or reading the speed over ground output from a GPS module. Other techniques for determining the velocity of the vehicle also fall within the scope of this disclosure.

When a vehicle changes its direction via steering, the angular speed about the yaw axis of the vehicle will vary. This metric can be used to detect a steering maneuver. In one embodiment, the angular speed about the yaw axis is measured by a gyroscope in the mobile phone. It is noted that a nonzero value from the gyroscope does not necessarily represent a left or right turn, since there exist other vehicle maneuvers such as lane changes and U-turns which incur similar results.

Figure 4:
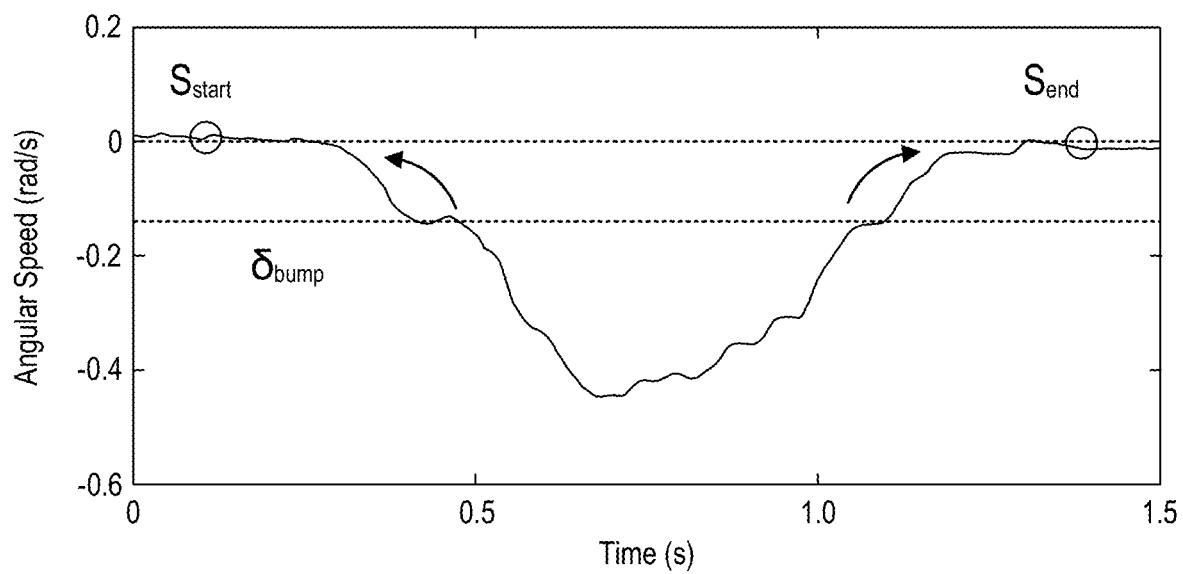
FIG. 4 is a graph showing left turn extraction from gyroscope readings.

Thus, the system extracts data only corresponding to a left or right turn. To do so, a steering maneuver is first detected at 24. A steering maneuver refers to vehicle maneuvers that suddenly change the vehicle's heading direction significantly, such as left/right turns, lane changes, U-turn, etc. In an example embodiment, the system recognizes that a steering maneuver has incurred when the yaw rate readings from the gyroscope show a "bump" shape as shown in FIG. 4. When a car changes its direction by making a left turn, the yaw rate reading from the gyroscope first decreases, reaches its minimum peak, and finally recovers back to approximately 0 rad/s when the left turn is completed. For a right turn, the signal pattern would be the opposite: increase, reach the maximum, and decrease. Depending on how the coordinates are aligned, a negative bump may reflect a right turn, not a left turn. However, in this disclosure, the yaw rate increases when rotated clock-wise. Based on such an observation, the system determines that a steering maneuver has occurred if the absolute yaw rate exceeds a certain threshold, $\delta_{bump}$ (e.g., 0.15 rad/s). Note that without the threshold ($\delta_{bump}$), even a small movement on the steering wheel would cause system to misdetect a steering maneuver. When a steering maneuver is not detected, the system continues to receive and monitor the sensor data as indicated step 24.

When a steering maneuver is detected, the start time and end time for the steering maneuver are identified in the signal received from the gyroscope as indicated at step 25. In the example embodiment, the system marks the start time/point of that steering maneuver as $s_{start}$ as when the absolute yaw rate, |Y|, first exceeded $\delta_{bump}$. Also, the system marks the end point, $s_{end}$, as when |Y| first drops back below $\delta_{bump}$. Since the steering would in fact have started a bit before $s_{start}$ and ended a bit later than $s_{end}$, where |Y|≈0 as shown in FIG. 4, the system moves points $s_{start}$ and $s_{end}$ backwards and forwards, respectively, until |Y|≈0. As a result, the system interprets that a steering maneuver was made at a time within $s=[s_{start}, s_{end}]$.

Figure 5:
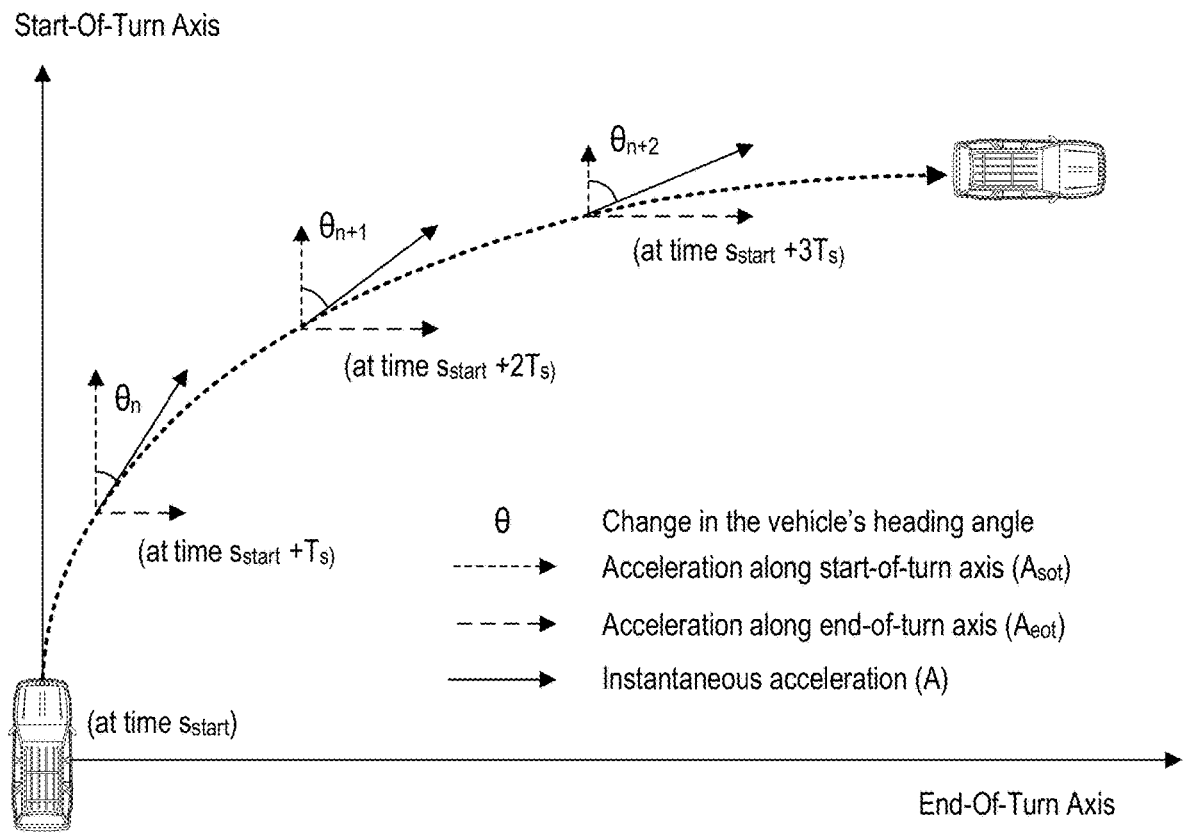
FIG. 5 is a graph showing changes in the vehicle's accelerations and heading angle during a right turn.

Next, the system determines whether the steering maneuver is a left or right turn at 26. The extracted steering maneuver may be comprised of not only left/right turns but also lane changes or U-turns, since those maneuvers yield similar bump-shaped yaw rate readings. In order to extract only left/right turns, the system derives the change in the vehicle's heading angle, which is defined as the difference in the vehicle's heading angle between the start and the end of a steering maneuver. FIG. 5 shows an example vehicle trajectory during a right turn where three IMU sensor readings were acquired at times $t=s_{start}+\{T_s, 2T_s, 3T_s\}$, i.e., sensors are sampled with frequency of $1/T_s$. As in step S1, let $t=s_{start}$ be the time when the vehicle was detected to have started the turn. Since the yaw rate readings from the gyroscope represent the vehicle's angular velocity around the vertical Z-axis, the change in the vehicle's heading angle after time $nT_s$ has elapsed since $s_{start}$, $\theta[nT_s]$, can be approximated as $$\theta[nT_s] \approx \theta[(n-1)T_s] + Y_n T_s = \sum_{k=1}^{n} Y_k T_s, \quad (1)$$

where $Y_n$ denotes the n-th yaw rate reading since $t=s_{start}$. Therefore, at the end of making a right turn, the eventual change in the vehicle's heading angle, $\theta_{final} = \theta[s_{end} - s_{start}]$ would be approximately 90°; whereas, at the end of a left turn it would be −90°. This change in the vehicle's heading angle is a good indicator in determining whether the vehicle has made a left or right turn. For comparison, for lane changes, $\theta_{final} \approx 0°$; whereas, for U-turns, $\theta_{final} \approx 180°$. Thus, the system calculates the $\theta_{final}$ of a detected steering maneuver (made during $s_{start} \sim s_{end}$), and only retains it such that $70° \leq |\theta_{final}| \leq 110°$, i.e., approximately ±90°. Thus the determination of whether a steering maneuver is a turn is based on the signal received from the gyroscope and the change in direction of travel. Note that since left/right turns usually take only a short period of time (<3 seconds), drifting in the gyroscope sensor during a turn does not affect system performance.

As a result, whenever the driver makes a left/right turn, the system can acquire a portion of the signal which was output during the turn, i.e., during $s=[s_{start}, s_{end}]$. However, since different road geometries may result in different turning radii, the length of the readings may vary, which may affect the performance of the system. Thus, in order to make fingerprinting accuracy independent of path selection and only driver-dependent, the extracted portion of the signal is preferably interpolated to a fixed length. This also enables the system to fingerprint the driver even when using two different devices that may have different sampling rates.

Figure 6A:
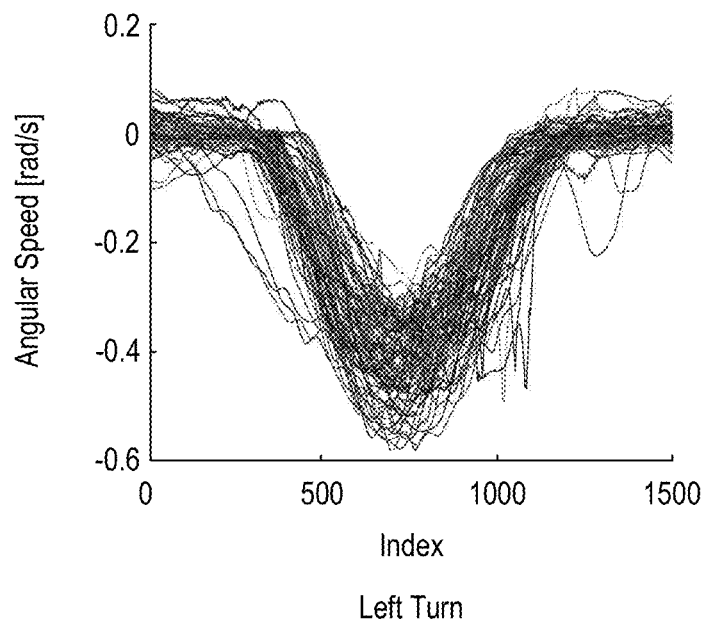
FIGS. 6A and 6B are graphs showing interpolated gyroscope readings for a left turn and right turn, respectively.
Figure 6B:
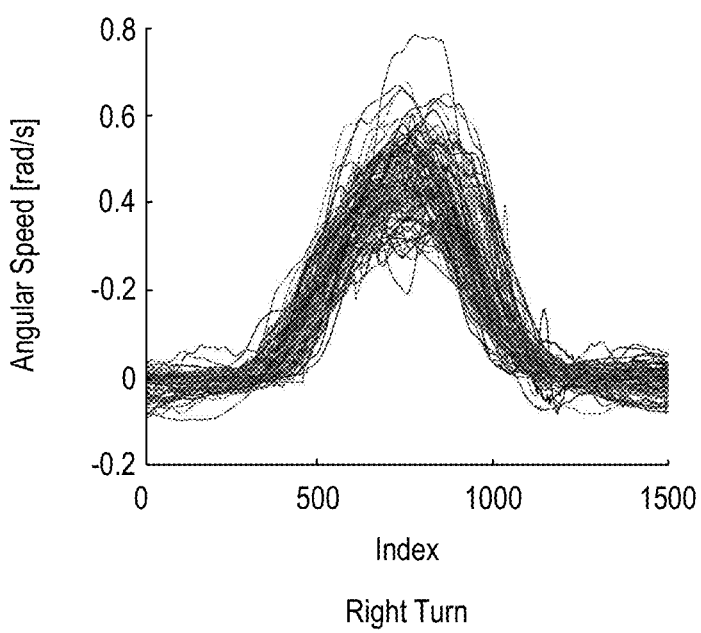

FIGS. 6A and 6B show the gyroscope readings of twelve different drivers' left and right turns after interpolation. Near-equivalent shapes of the gyroscope readings indicate that via interpolation, the analyses can be done from a consistent viewpoint, despite turns being made on different road geometries. Below it will be shown through evaluations that since the variance in left turn radii is usually much higher than that in a right turn—as right turns usually start from only one lane—without such an interpolation, fingerprinting accuracy drops more when using left-turn measurements than when using right-turn measurements.

Whenever the driver makes a left/right turn, the system acquires an IMU sensor data stream of gyroscope and accelerometer readings, which were output during the turn. The main challenge in fingerprinting a driver, however, would be determining which features to extract from the data stream.

When drivers make either a left or a right turn, one might notice that some drivers have their unique pattern in making the turn. In the example embodiment, the system extracts the following three features for driver fingerprinting:

$F_1$. Acceleration along the end-of-turn axis ($A_{eot}$)
$F_2$. Deviation of $F_1$ ($\Delta A_{eot}$); and
$F_3$. Deviation of the raw yaw rate ($\Delta Y_{raw}$).

By extracting one or more features at step 27, the system thereby forms a fingerprint indicative of the turn made by the vehicle and thus the driver of the vehicle. More or less features can comprise the fingerprint.

As depicted in FIG. 5, the start-of-turn (SOT) axis is defined as the axis/direction in which the vehicle was detected to have started its turn (direction at time $s_{start}$). In reference to the SOT axis, the end-of-turn (EOT) axis is defined as the one orthogonal to the SOT axis. That is, regardless of the change in the vehicle's heading angle after the turn (e.g., 95° for a right turn), by definition, the EOT axis is set perpendicular to the SOT axis.

The reason for using the acceleration along the EOT axis as an interesting yet powerful feature in the system is that it represents both 1) how much the driver turns his/her steering wheel and 2) at that moment how hard the driver presses the break/acceleration pedal during the left/right turn. In other words, it reflects one's (unique) turning style. Later it will be shown through extensive evaluations that the features used do not depend on the vehicle type or route but only on the driver's unique maneuvering style. Note that instantaneous acceleration, which is referred to as the acceleration along the vehicle's heading axis, measured during a turn would only reflect the driver's input/actions on the break/acceleration pedal but not on the steering wheel. Similarly, the instantaneous yaw rate, i.e., the angular velocity of the vehicle, measured from the gyroscope sensor would only reflect the driver's actions on the steering wheel.

For deriving the vehicle's acceleration along the EOT axis when $nT_s$ seconds has elapsed since $s_{start}$, $A_{eot}[nT_s]$, the system utilizes the vehicle's instantaneous acceleration, $A[nT_s]$, at that moment (obtained from the accelerometer) and its change in the heading angle, $\theta[nT_s]$ (extracted from the gyroscope) as:

$$A_{eot}[nT_s] = A[nT_s] \sin(\theta[nT_s]) \quad (2)$$

In addition to the acceleration along the EOT axis, the value along the SOT axis may also be used. However, since the information the system would obtain from the accelerations along the SOT axis would be redundant when those along the EOT axis are already available, these features are not used in the example embodiment, thereby reducing the feature space.

As an alternative to $A_{eot}$, one can think of using centripetal/lateral acceleration, which would be perpendicular to the vehicle's instantaneous acceleration (A). However, since the centripetal acceleration is affected by the turning radius; whereas, the acceleration along the end-of-turn axis is not, this feature is not considered in the example embodiment but may be used in other embodiments.

The system derives not only $A_{eot}$ but also $\Delta A_{eot}$, i.e., the difference between subsequent acceleration values along the EOT axis. Since $\Delta A_{eot}$ reflects how aggressively the driver concurrently changes his steering and pedal actions during a turn, this is a feature that captures the driver's aggressiveness during the turn.

In addition to $\Delta A_{eot}$, the system also determines the deviations in the raw yaw rate measurements, $\Delta Y_{raw}$. Note that in order to accurately extract left/right turns, the system pre-processed the data with a low-pass filter. However, as the turns are already extracted, in order to not lose the accurate understanding/interpretation of how aggressively the driver turns his steering wheel during a turn, the system also derives $\Delta Y_{raw}$; the driver's aggressiveness shown from the low-pass filtered data would have been reflected in $F_2$. In addition to the driver's aggressiveness of turning the steering wheel, this feature also captures how stable the driver maintains an angle during the turn(s) and thus helps driver fingerprinting. While three particular features have been described, other types of features also fall within the broader aspects of this disclosure.

Figure 7:
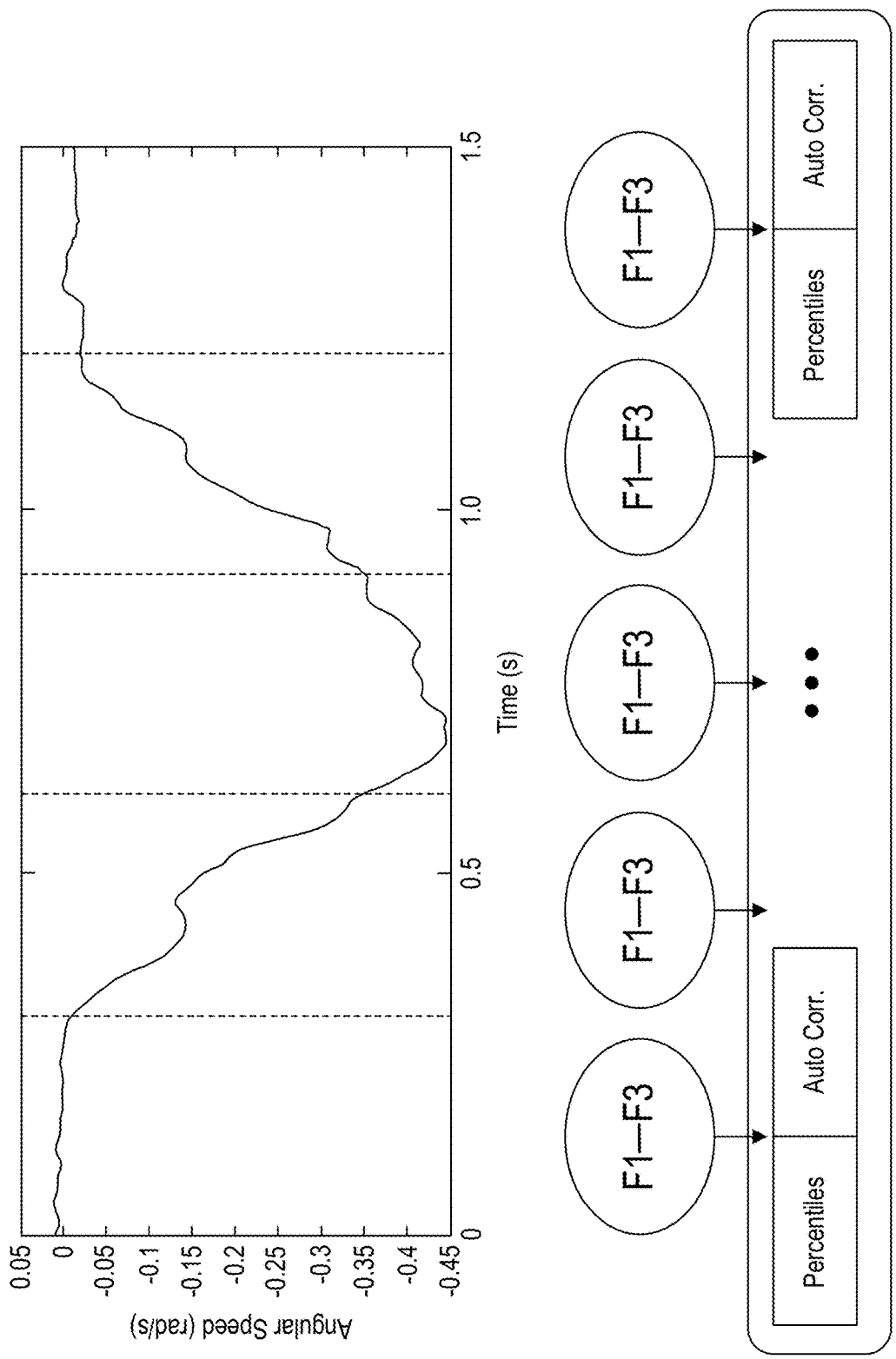
FIG. 7 is a graph depicting how to construct an example feature vector.

For comparison purposes, a feature vector may be constructed. In one embodiment, the three particular features described above $F_1$-$F_3$ comprise the feature vector. In a more robust embodiment, the feature vector is constructed as follows:

1. Upon detection of a turn, the system divides the IMU sensor measurements (acquired during the turn) into 5 stages or segments as seen in FIG. 7. Each segment may have the same or different time duration.

2. For each segment, the system determines $F_1$-$F_3$.

3. For each of $F_1$-$F_3$, the system then determines its {10, 25, 50, 75, 90}-th percentiles and its autocorrelations at 1~10 lags and aggregates them to construct a feature vector. The system does not use statistics such as mean, variance, and minimum/maximum, since (based on our observation) they do not help in fingerprinting the driver; they only increase the size of the feature space. Note that the system generates an instance with such a feature vector per (detected) turn. With the percentiles, the system understands the distributions of $F_1$-$F_3$ in each stage of turn.

Figure 8:
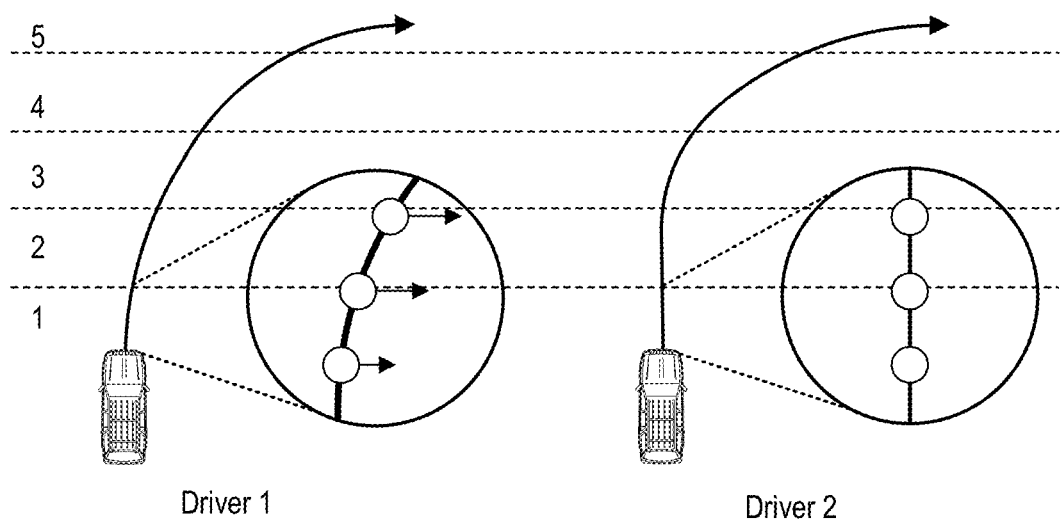
FIG. 8 is a diagram illustrating different autocorrelations depending on the driver's turning style.

Meanwhile, a more interesting and powerful feature for the system in fingerprinting the driver is the autocorrelations of $F_1$-$F_3$ in each stage of turns. FIG. 8 shows an example of two different drivers making a right turn. When making the right turn, one can see that driver 1 started turning his steering wheel during stage 1 of the turn; whereas, driver 2 started it later during stage 3. As shown in FIG. 8, which also illustrates the accelerations along the EOT axis ($A_{eot}$) during stage 1, one can see that an early turn from driver 1 incurs non-zero values of $A_{eot}$ in stage 1 of the turn. On the other hand, since driver 2 drives further on a straight line along the SOT axis, his $A_{eot}$ values in stage 1 would approximately be 0. Similarly, values of $F_2$ and $F_3$ would also remain 0 for driver 2 but not for driver 1. As a result, the autocorrelations of $F_1$-$F_3$ for driver 1 would show significantly different values from those for driver 2, i.e., drivers' different maneuvering styles lead to different $F_1$-$F_3$ autocorrelations during a turn.

Figure 9:
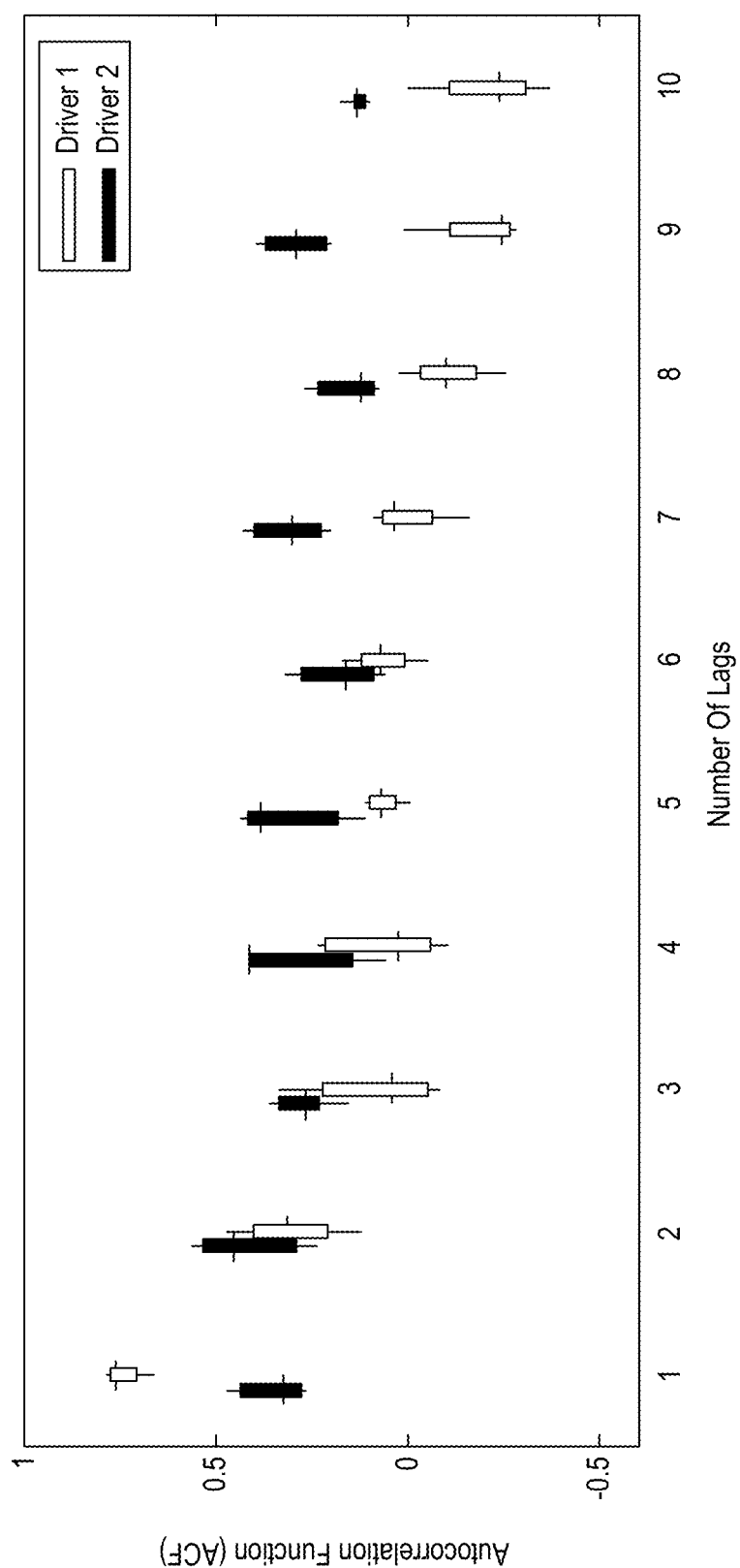
FIG. 9 is a graph showing a correlogram of feature $F_1$ for two drivers.

Are these autocorrelation values of $F_1$-$F_3$ different enough between drivers to be considered as a driver's fingerprint? Also, for a given driver, are those values consistent across multiple left/right turns? FIG. 9 shows the boxplots of $F_1$ autocorrelations for two drivers—who participated in an evaluation—during their first stage of left turns. One can see that since the tendencies of drivers moving straight or turning the steering wheel early/late at the early stages of turns were different, the autocorrelations (at different lags) between the two drivers were clearly distinguishable. Moreover, one can see that although the driver was making those left turns at different times and places, the variances in some autocorrelation lags were quite low, i.e., stable. Not only the first stage but also stages 2~5 showed a similar distinctiveness and stability. This shows that the autocorrelations of $F_1$-$F_3$ are not only distinct among drivers but also quite stable for a given driver, i.e., drivers' turning styles are relatively constant and distinct, so as to function as the core for the system in fingerprinting the drivers.

Returning FIG. 2, a newly formed fingerprint is then compared at 29 to the plurality of fingerprints stored by the system. In the example embodiment, the new fingerprint is compared to stored fingerprints using a support vector machine. Other types of machine classifiers, such as Random Forest or Naïve Bayes, are also contemplated by this disclosure. The driver is identified at 31 when the new fingerprint matches one of the stored fingerprints. In this way, the system can identify/fingerprint the driver as soon as the driver has made either a left or right turn, which is referred to as a "maneuver-based approach". When using those classifiers, however, the system (or the adversary exploiting it) is required to have a "well-formulated" training set containing instances with the correct labels, i.e., the driver's identity. Alternatively, the adversary may in fact construct/obtain this training set via unsupervised machine learning as will be further described below. It is to be understood that only the relevant steps of the methodology are discussed in relation to FIG. 2, other software-implemented instructions may be needed to control and manage the overall operation of the system.

Albeit quite effective, when trying to fingerprint the driver within just one turn, some false positives/negatives may occur, possibly due to a sudden change in traffic signals, interruptions from pedestrians, etc. Hence, in order to remove such false positives/negatives, the system can exploit the "accumulated" data obtained from multiple left/right turns within a trip that the driver is making, i.e., trip-based approach. Note that during a trip the driver remains the same.

One way the adversary might achieve this is by exploiting the Naive Bayes classifier, which is a simple probabilistic classifier based on the Bayes' theorem. For a given vehicle driven by N different drivers, assume that the adversary has a training set composed of several instances labeled as one of $D_1, \ldots, D_N$. Then, within the trip in which the adversary attempts to fingerprint the driver, as the driver makes more turns, i.e., as more instances are collected, the adversary can estimate the maximum posterior probability (MAP) and thus predict the driver to be $D_{pred}$ as:

$$D_{pred} = \arg\max p(D_k)\Pi_{i=1}^{n} p(T_i|D_k), k \in \{1, \ldots N\} \quad (3)$$

where n is the number of vehicle turns made up to the point of examination during the trip. Here, $p(T_i/D_k)$ represents the likelihood that the (measured) i-th turn, $T_i$, would have occurred, given driver $D_k$ is driving the vehicle. Even though the adversary assumes that the prior probability, $p(D_k)$ is equivalent across the potential drivers, i.e., each driver has an equal probability of driving that vehicle, as later shown through evaluations that the adversary can fingerprint the driver with higher accuracy than just using one turn, although, in most cases, one turn was sufficient in correctly fingerprinting the driver.

Figure 18:
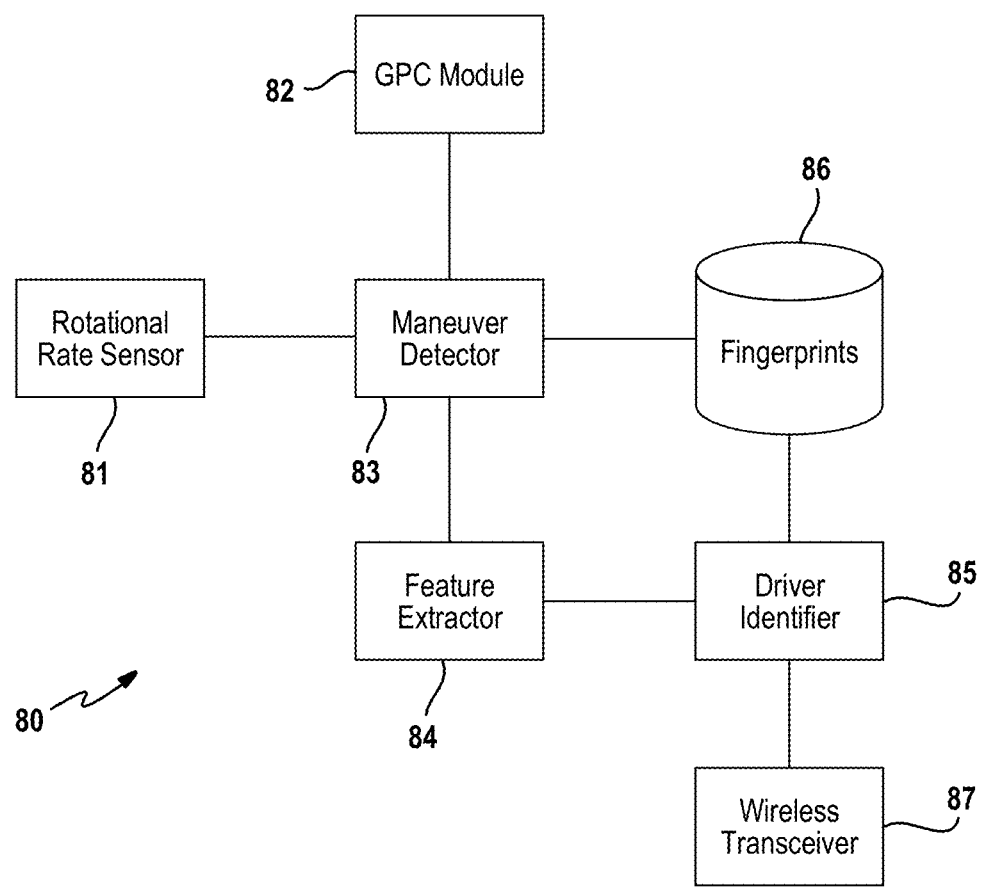
FIG. 18 is a block diagram of a system that identifies a driver and implemented on a mobile device.

FIG. 18 depicts an example embodiment for implementing the vehicle driver identification technique in a mobile device, such as a cell phone. One or more rotational rate sensors 81 reside in the mobile device. At least one of these sensors is configured to generate a signal indicative of angular speed about a yaw axis of the vehicle while the vehicle is being driven by a given driver. Example rotational rate sensors 81 may include but are not limited to a gyroscope, an accelerometer or a combination thereof. To monitor and detect a change in direction of travel by the vehicle, the mobile device utilizes readings from a GPS module 82 or other types of sensors as well.

A maneuver detector 83 is configured to receive the signal from the rotational rate sensor. From the received signal, the maneuver detector operates to detect a vehicle maneuver made by the vehicle and identify a portion of the detected maneuvers as being a turn made by the vehicle. In some embodiments, each of the detected vehicle maneuvers is classified into one of three classes selected from a group consisting of a lane change, a turn and a curvy road. The maneuver detector 83 further operates to monitor and detect changes in direction of travel by the vehicle. To do so, the maneuver detector may rely upon signals from the rotational rate sensor and/or other sensors (e.g., magnetometer) residing in the mobile device.

A feature extractor 84 is in data communication with the maneuver detector 83. The feature extractor 84 in turn extracts one or more features from the signal identified as being a turn. To do so, the feature extractor 84 determines a start time and an end time for a vehicle maneuver classified as a turn and then extracts the one or more features using a portion of the received signal between the start time and the end time. In this way, the extracted features form a fingerprint indicative of the turn made by the driver.

A driver identifier 85 is in data communication with the feature extractor 84 and configured to receive the new fingerprint from the feature extractor 84. The driver identifier compares the new fingerprint to the plurality of known fingerprints and identifies the given driver of the vehicle based on the comparison of the new fingerprint to the plurality of fingerprints. The plurality of fingerprints are stored in a non-transitory computer memory or data store 86. Each fingerprint in the plurality of fingerprints corresponds to a particular driver of the vehicle and is indicative of a turn made by the particular driver. In one example embodiment, the new fingerprint is compared to the plurality of fingerprints using a support vector machine although other types of classifiers are also contemplated. In this example, the maneuver detector, the feature extractor, and the driver identifier are embodied as computer readable instructions stored on a non-transitory computer readable medium. The processing described above is performed when the computer readable instructions of the maneuver detector, the feature extractor and the driver identifier are executed by a computer processor of the mobile device. In other examples, functionality of the maneuver detector, the feature extractor and the driver identifier may be implemented by an Application Specific Integrated Circuit (ASIC), an electronic circuit, a combinational logic circuit, and/or other suitable components that provide the described functionality.

An interesting yet challenging question in making this approach practical is: how would an adversary formulate the training data-set from scratch?. Up to this point, it has been assumed that when fingerprinting the driver via sensor data, a "well-formulated" training dataset with the correct labels (to be used in machine classifiers) was already given to the adversary. However, in many instances, it will be unlikely for the adversary to have acquired the correct labels for the training dataset—especially from a zero-basis/scratch—thus undermining the practicability of the driver fingerprinting threat.

As illustrated in FIG. 1, once the adversary collects new sensor data, $S_{new}$, of some driver, the system 10 determines whether $S_{new}$ would have originated from one of the known/learned drivers or whether it has come from a new (unknown/unlearned) driver. In the former, the adversary can expand his existing training set; whereas, in the latter, he would have to construct a new training set for that new driver. Such a process is important, especially when the adversary first starts to fingerprint the driver of a vehicle, i.e., starting from scratch.

Here, this disclosure briefly discusses that the adversary can indeed utilize unsupervised machine learning to correctly cluster/label $S_{new}$ to either an already-known or a new driver. What the adversary may do is label $S_{new}$ based on its log-likelihood obtained from a Gaussian mixture model (GMM). GMM is a combination of Gaussian component densities that are used for modeling the probability distribution of continuous measurements. Further details regarding this example technique are described by Douglas Reynolds et al. in "Robust Text-Independent Speak Identification Using Gaussian Mixture Speaker Models" In IEEE Transactions on Speech and Audio Processing (January 1995).

Suppose the adversary starts to fingerprint the driver(s) of a given vehicle. At first, since he has an empty training set, he first builds a GMM model, $M_1$, based on the sensor data acquired during the vehicle's first trip and labels it as (some) driver $D_1$. Then, during the next trip, when the adversary acquires $S_{new}$, he calculates the log-likelihood of $S_{new}$ given $M_1$. Accordingly, if the log-likelihood is high, meaning that $S_{new}$ is likely to be output by driver $D_1$, the system appends $S_{new}$ to the training set with label D1. On the other hand, if the log-likelihood is low, $S_{new}$ is likely to have been generated by some other driver $D_2$. In such a case, the system makes a new training set for driver D2 via $S_{new}$.

The adversary can construct the training dataset more concretely if he knows exactly who $D_1$ is (e.g., $D_1$="Alice"). This can be achieved not only via oversight but also based on other side channel information. For example, if the adversary knows that Alice always drives the car to work in the morning, the data being collected in that time window is more likely to reflect Alice's driving behavior. In fact, such an approach would not only make the adversary build a concrete training set but also let him estimate the prior probability of a driver driving the vehicle—$p(D_k)$ in Eq. (3)—and thus increase the fingerprinting accuracy.

Next, this disclosure will show that an adversary can construct/obtain a well-formulated training set via this GMM approach. It is also shown through extensive evaluations that even when the training dataset obtains few instances with incorrect labels, i.e., (slightly) defective training set due to the low-resource adversary's mistake, he may still be able to identify the driver with high accuracy.

To thoroughly evaluate and understand system performance under various settings, experiments were conducted in two different scales. First, this disclosure started with a small-scale experiment where different factors were varied/controlled such as driver, car, route, which may (or may not) affect system performance. It was also verified whether the derived features in the system and their performance are dependent only on the driver. Next, once such verification was made, data was collected from more drivers, who drove different cars and took different routes. Such a large-scale experiment was conducted to validate that the approach derived features for a given driver remain very consistent even on different routes. Overall, the driving data collection took three months and had more than 20 hours of driving data obtained from urban/suburban areas.

The data-collection module of the system was implemented as an Android application and was installed on various models of Android smartphones including Google Pixel, Nexus 5X, Samsung Galaxy S5, and Samsung Note 5. Twelve drivers (9 male and 3 female drivers) were recruited with an age span of 22-50. The recruited drivers were instructed to turn on the app before starting their trip/driving. To grant participants more control on their driving data, the protocol let each participant select whether to upload or discard the data after finishing a trip. Since the system does not require any personal information from the users, the Institutional Review Boards (IRB) of our university classified this effort as non-regulated.

Figure 10B:
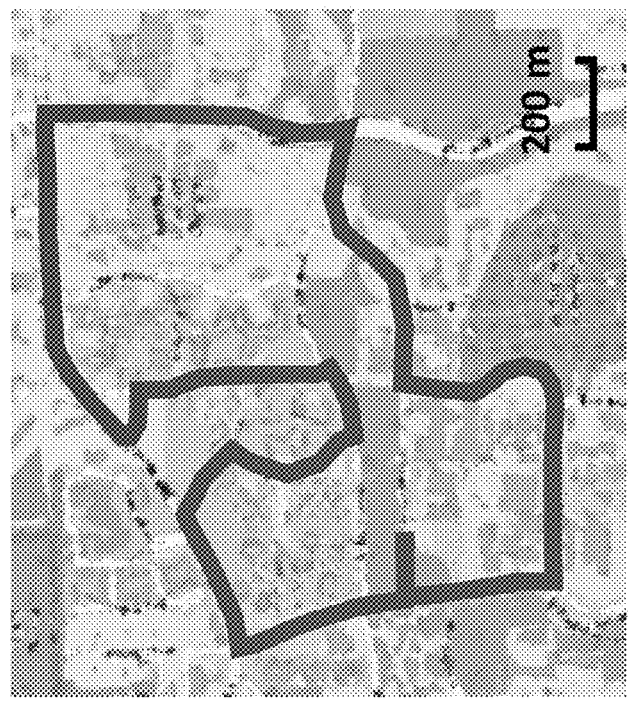
FIGS. 10A and 10B are maps showing data collection in two different type of areas.
Figure 10A:
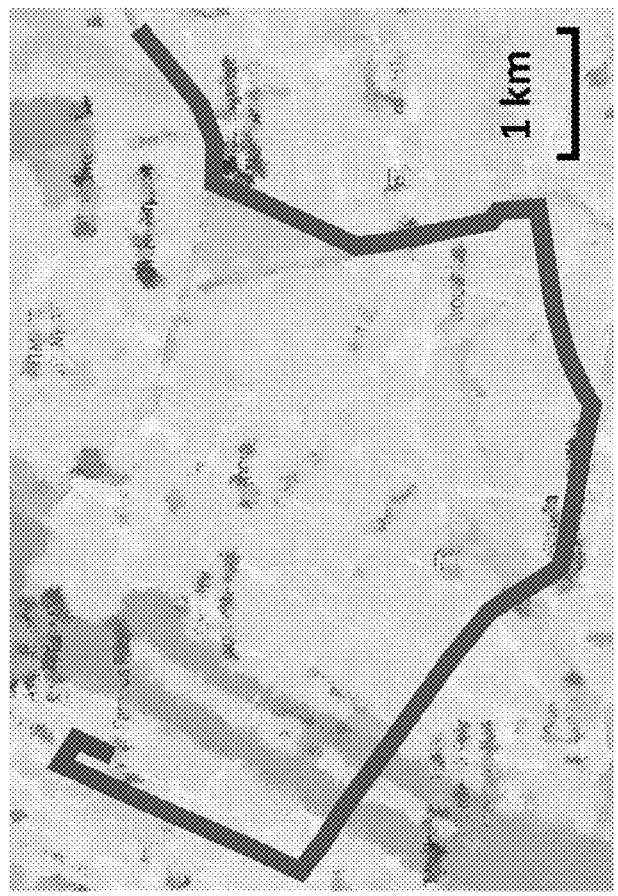

In the small-scale experiment, to verify the factors which affect system performance, two recruited drivers were asked to drive a Honda Sedan and a Ford SUV. The routes on which the drivers drove were either a route of their own choice (an example shown in FIG. 10A) or a pre-determined route around the campus as shown in FIG. 10B. Two GPS traces were collected to show the route layout. In the large-scale experiment, to validate that the derived features in the system and thus its fingerprinting do not depend on the vehicle of choice, the protocol allowed all participants to drive their own vehicles. As a result, data was collected from ten cars having seven different models: Honda Accord Sedan, Honda CRV SUV, Toyota Camry Sedan, Ford Explorer SUV, Hyundai Elantra Sedan, Jeep Compass SUV, and Toyota Corolla Sedan. Moreover, the routes were also freely chosen by the driver which included those in a suburban area with less traffic or a metropolitan area with heavy traffic.

To verify that the fingerprinting accuracy of the system only depends on the driver, not on the car or route, the protocol conducted a factor analysis via a small-scale experiment. As shown in Table 1, six experiments were conducted, T1-T6, with same/different drivers, cars, and/or routes. For test T7, every factor was varied as will be described later.

TABLE 1

Summary of evaluations.

| Differentiated Factor(s) | Driver | Car | Route | Acc. |
|---|---|---|---|---|
| T1. Car | = | ≠ | = | Low |
| T2. Route | = | = | ≠ | Low |
| T3. Car, Route | = | ≠ | ≠ | Low |
| T4. Driver | ≠ | = | = | High |
| T5. Driver, Car | ≠ | ≠ | = | High |
| T6. Driver, Route | ≠ | = | ≠ | High |
| T7. Driver, Car, Route | ≠ | ≠ | ≠ | High |

For tests T1-T6, three factors were varied/controlled as follows. First, for test cases T4-T6 where the driver was differentiated, two different drivers were asked to drive a same/different car with specified instructions when needed, e.g., whether to drive on a pre-determined route. Second, for test cases T1, T3, and T5 in which the car type was varied, two different cars were used: Honda Accord Sedan and a Ford Explorer SUV. Third, for test cases T1, T4 and T5, where the route was fixed, drivers were asked to drive around campus along the pre-determined route shown in FIG. 10B. For other test cases (T2, T3, and T6) where the route was differentiated, the route was solely determined by the drivers. If the system constructed features only depend on the driver factor, i.e., dependent on only the driver's unique turning style, system performance in test cases T1-T3 would be low; whereas in T4-T6, it should be high.

For each test case, the system acquired data from two different trips, which differ in driver/car/route or a combination thereof (as shown in Table 1). As the two trips (per test case) have distinct factors, the vehicle turns are labeled based on which trip they occurred. For example, in T1 where "car" was the only different factor between the two trips, although the driver was identical, the vehicle turn data from each trip were labeled differently as 0 and 1, i.e., binary. Similarly in T6 where the "driver" and "route" were the different factors, turns from each trip were again labeled 0 and 1. Based on the collected data from the two trips of cases T1-T6, the protocol trained the machine classifiers using 90% of the turns as the training set and the remaining 10% as the test set. To obtain an accurate estimate of the model prediction performance, 10-fold cross validation was used. For each test case, as turns from two different trips (with different drivers/cars/routes) were collected, the binary classification was used. The classifiers used for testing T1-T6 were Support Vector Machine (SVM) and a 100-tree Random Forest. Other types of classifiers also fall within the scope of this disclosure.

Figure 11:
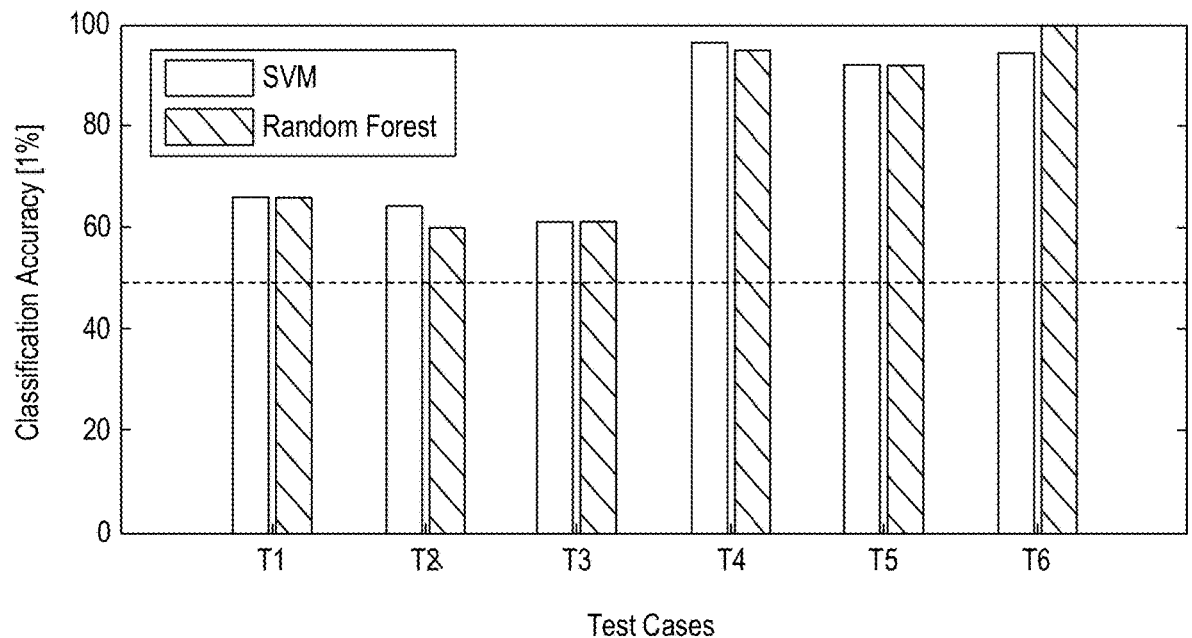
FIG. 11 is a graph showing system classification accuracy using SVM and Random Forest for test cases T1-T6.
Figure 12:
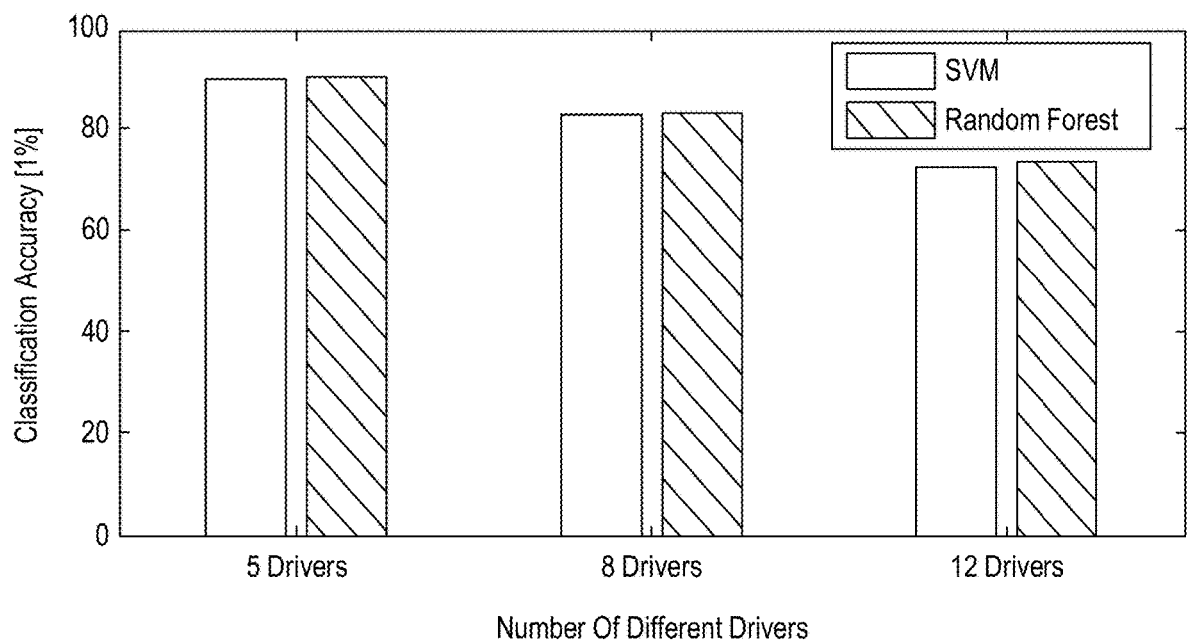
FIG. 12 is a graph showing system accuracy in fingerprinting 5, 8 and 12 drivers within one vehicle turn using SVM and Random Forest.

FIG. 11 plots accuracies of the system in fingerprinting the driver based one single turn in T1-T6, when using SVM and Random Forest. Since the classification only needed to be binary, random guessing would lead to a 50% classification accuracy, which is shown as a horizontal dotted line.

One can see that for test cases T1-T3, although the vehicle and/or the route were different, the system showed a very low classification accuracy: 66.6%, 64.2%, 61.1% using SVM, and 66.6%, 60.4% 61.1% using Random Forest in cases T1-T3, respectively. Such a result can, in fact, be interpreted as having a similar accuracy as when it is guessed randomly. This also implies that regardless of the car or route used/taken, if the driver is identical, the system gets confused.

When the "driver" factor was changed as in test cases T4-T6, one can see from FIG. 11 that the classification accuracy of the system was much higher: 96.3%, 91.7%, 94% using SVM, and 95%, 91.7%, 100% using Random Forest in cases T4-T6, respectively. Such a high classification accuracy was due to the fact that between the two trips of T4-T6, the drivers were different.

Based on these results, one can conclude that the features which the system derives depends only on the driver and not on other factors such as car and/or route, thus functioning as the key for accurate driver fingerprinting. Moreover, system performance is shown to be consistent across different machine classifiers.

To further evaluate system performance with more drivers, and to verify whether its derived features for a given driver remain consistent across different routes, a large-scale experiment was conducted using all of the sensor data acquired from the 12 participants who drove 10 different cars and for approximately 20 hours in total. As most of these participants drove different cars on different routes, test case T7 represents such a setting.

In T7, since there were more than 2 drivers when using SVM and Random Forest, a multi-class classification was performed. To achieve this, the protocol examined it through one vs. one reduction rather than one vs. all since the former reflects more accurate results than the latter. In the dataset, feature vectors of turns were labeled depending on who the driver was. Again, 10-fold cross-validation was performed for an accurate performance measure.

How well the system identifies 5, 8, and 12 drivers was first evaluated using a maneuver-based approach, i.e., after observing only one left/right turn. FIG. 11 plots system accuracy in fingerprinting 5, 8, and 12 different drivers using SVM and Random Forest. One can see that within only one left/right turn, the system can fingerprint the driver with 90.5%, 83.1%, and 72.8% accuracies across 5, 8, and 12 drivers, respectively, using SVM. When Random Forest is used, the fingerprinting accuracies were shown to be 90.8%, 83.5%, and 74.1% across 5, 8, and 12 drivers, respectively. Although only mobile IMU sensors were used by the system, the system was able to correctly identify the driver even though the number of candidates got larger; much better than random guessing. Such an achievement was made by observing only one left/right turn.

A discussed earlier, instead of trying to fingerprint the driver based on one turn, the adversary may attempt to do it by accumulating sensor data of multiple turns collected within the trip, i.e., trip-based approach. To evaluate how well an adversary exploiting the system may fingerprint the driver with such an approach, the system was evaluated as follows. Per iteration, from the 12-driver driving dataset, the protocol randomly selected one trip made by some driver; each driver made at least 2 trips. Then, the protocol first randomly permuted the vehicle turns made within that trip and then considered those as a test set. Vehicle turns made in all other trips were considered as our training set. In predicting who the driver was in the (randomly) selected trip (i.e., the driver of the test set), the Naive Bayes classifier was used, which predicts the label based on the maximum a posteriori (as in Eq.(3)). The prior probability was set to be uniform and evaluated 500 times.

Figure 13:
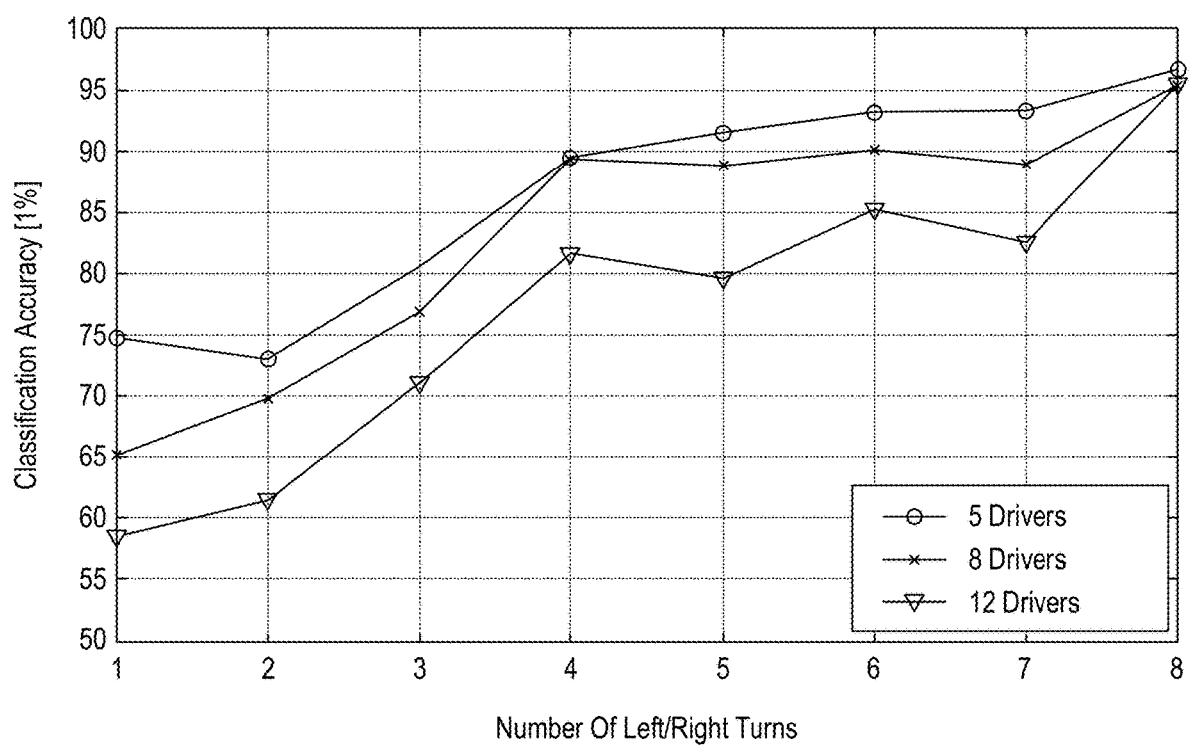
FIG. 13 is a graph showing system classification accuracy using Naïve Bayes for a trip-based approach.

FIG. 13 plots system accuracy in identifying the driver correctly for the 500 iterations using a trip-based approach, when the number of candidate drivers were 5, 8, and 12. For evaluating the first two cases with 5 and 8 drivers, per iteration, they (as well as their trip/turn data) were randomly chosen from the total of 12 drivers. One can see that as more left/right turns were observed and analyzed by the system, its classification accuracy continuously increased. After observing 8 left/right turns, the system achieved fingerprinting accuracies of 96.6%, 95.4%, and 95.3% across 5, 8, and 12 drivers, respectively, which obviously is a great improvement over the "maneuver-based approach", i.e., fingerprinting after one left/right turn. Since the way the drivers made their left/right turns was occasionally inconsistent, one more turn made by the driver did not necessarily increase system performance, i.e., performance did not monotonically increase. However, since the drivers made most of their turns according to their usual tendency/habit, ultimately the accuracy improved. Note that the accuracy of fingerprinting the driver via Naïve Bayes after only one turn was a bit lower than when using other classifiers such as SVM or Random Forest due to its (naïve) independence assumptions.

As discussed earlier, to make fingerprinting as independent as possible from the road geometry in which the turns are made, the data is interpolated to a fixed length. To evaluate the efficacy of such an interpolation, system accuracy was evaluated across 12 drivers when not executing such an interpolation.

TABLE 2

Efficacy of data interpolation.

|  | Left Turn | | Right Turn | |
| --- | --- | --- | --- | --- |
|  | SVM | RF | SVM | RF |
| w/Interpolation | 73.1% | 78.0% | 74.1% | 74.3% |
| w/o Interpolation | 65.2% | 72.0% | 71.5% | 72.2% |
| Average difference | −6.95% | | −2.35% | |

Table 2 summarizes how the system performed when fingerprinting the 12 drivers based on only left and right turns with/without interpolation. One can observe that when the data from different trips were not interpolated, the performance of the system dropped. The reason for such a drop was that road geometries for different turns (even for the same driver) were not identical, i.e., the turning radii are different. So, through interpolation, the system was able to remove the possible influence of the differences in turning radii, and thus achieve more accurate driver fingerprinting. Note that a driver's turning radii can vary depending on where s/he is driving. Here, an interesting observation from the result is that system accuracy dropped more when fingerprinting the driver via left turn(s) than via right turn(s). This was because the turning radii for left turns normally have much higher variations between them than for right turns; left turns can start from multiple lanes, whereas right turns (mostly) start from the rightmost lane.

It was also discussed earlier how the adversary may use GMM to construct/obtain the training dataset for driver fingerprinting from scratch. To validate this, consider the following case. Suppose that driver D (among the 12 drivers) was the first to drive the vehicle since the adversary started to fingerprint its driver. Thus, the adversary constructs his initial training dataset, $M_{init}$ with label D. In such a case, examine what the GMM log-likelihood would be for the data collected from a new trip given $M_{init}$.

FIG. 13A plots what the log-likelihood values were when data from 12 different trips. Trip1-Trip 12 (each chosen from the 12 different drivers' trips) were considered as the test set, thus being examined against the GMM of $M_{init}$. $M_{init}$ was constructed based on one of driver D's trip data, which was not included in the 12-trip test set. One can see that for only the data in Trip2, the log-likelihood was positive whereas for all others the values were negative or even negative infinite. This was because the driver of Trip2 was D. Such a result shows that by observing the GMM likelihood, the adversary can determine whether or not the newly collected data has been output by an existing driver in his training dataset. In this case, the adversary would append the newly collected data from Trip2 to its initial dataset, $M_{init}$, and label it as D.

Figure 14B:
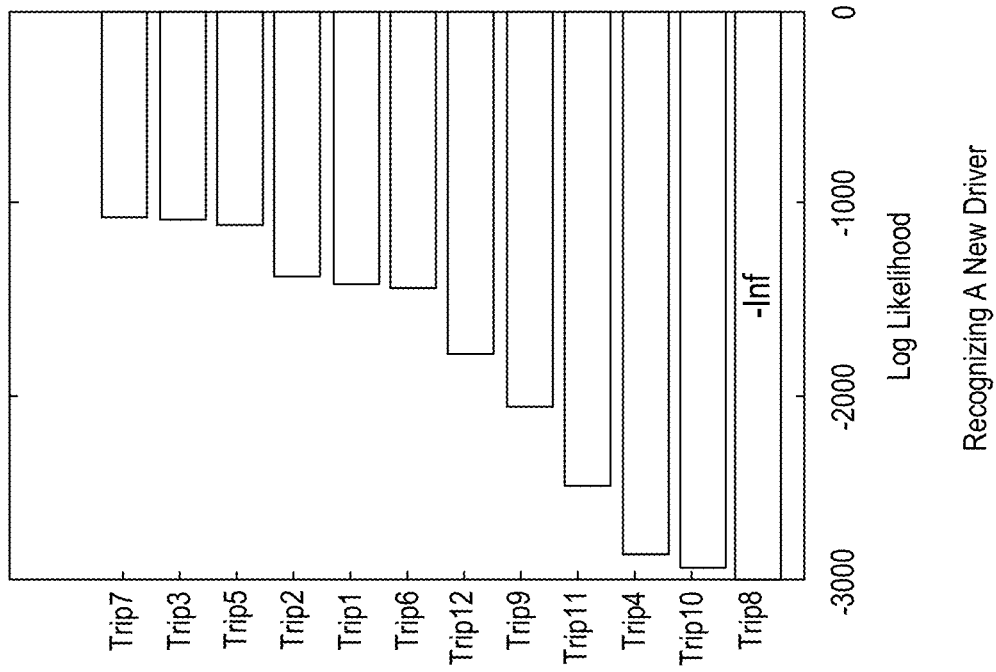
FIGS. 14A and 14B are graphs showing recognition of a learned driver and a new driver, respectively, using GMM for training set formulation.
Figure 14A:
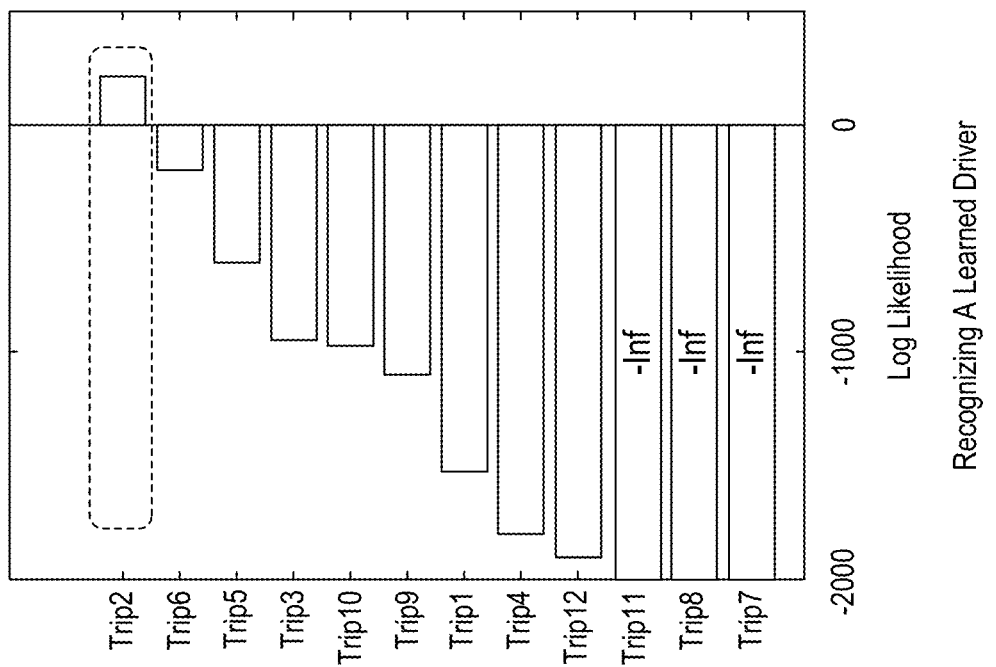

This time, the protocol randomly chose another trip from our 12-driver dataset and considered that as the adversary's new initial training set, i.e., different D and $M_{init}$ (than the previous ones). Again consider the test set to be composed of 12 different trip data, but this time, made by drivers except for the chosen D. FIG. 14B plots the GMM log-likelihood values of data in the test set given the new $M_{init}$. One can see that, since there were no trips within the test set taken by the same person as D, all showed negative/negative-infinite likelihoods. In such a case, the system would determine that the newly collected data was output by a new driver, which he had not learned about, and thus construct a new training dataset for that driver.

When forming the training set via GMM, the standard for clustering new data was whether the GMM log-likelihood is positive or not. However, such a threshold setting may not always be reliable. Thus, to understand and evaluate how system performance will be affected when the adversary wrongly labels a turn while constructing the training dataset, e.g., a turn was made by driver 1 but the adversary labels it as by driver 2, from our dataset of 5 drivers, the protocol arbitrarily picked and labeled some turns to be made by any of the 5 drivers. The number of arbitrarily picked turns with erroneous labels were varied via parameter $p_{err}$, which denotes the percentage of such erroneous labels. For this evaluation, the results presented were obtained via SVM.

Figure 15:
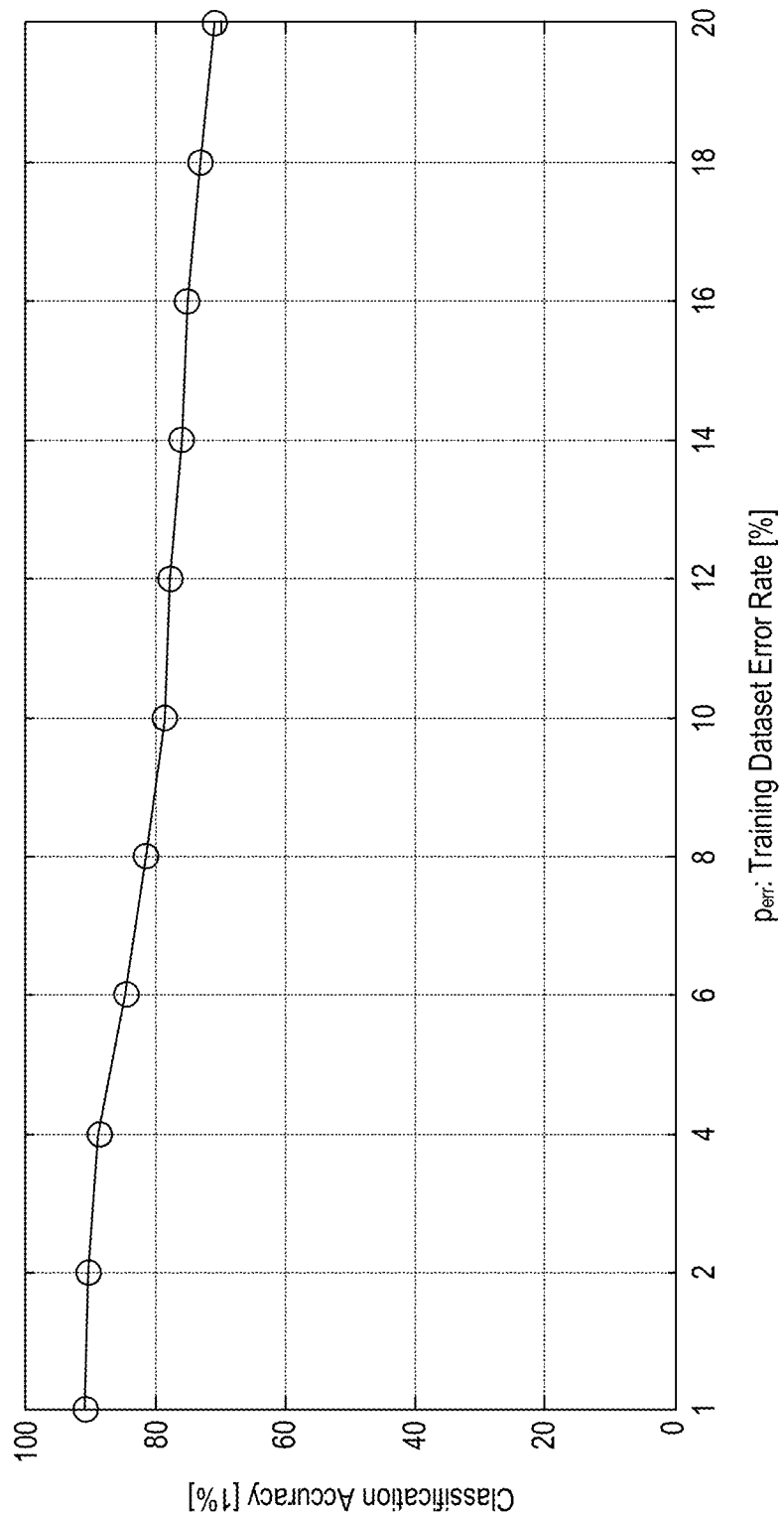
FIG. 15 is a graph showing system classification accuracy when $p_{err}$ % of the training dataset is erroneous.

FIG. 15 shows how fingerprinting accuracy changed for $p_{err}$=0~20%. Even when the training dataset for the system contains 20% of erroneous labels due to the adversary's mistake, the adversary can still achieve 70.7% fingerprinting accuracy within only one turn. Despite the erroneous labels, such an accuracy can be increased further using a trip-based approach. Such a result implies that the adversary may not always have to be 100% accurate in constructing the training dataset in order to accurately fingerprint the driver, which is a serious threat.

Figure 16:
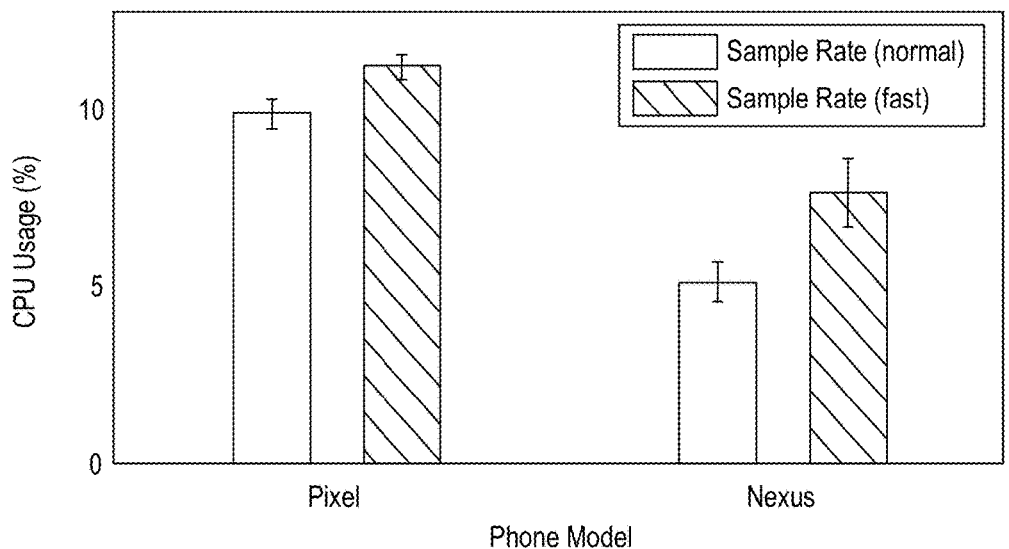
FIG. 16 is a graph showing CPU usage of the Dri-Fi system.

The additional overheads such as the CPU usage and energy consumption of the system on the victim's device may render the driver fingerprinting process noticeable by the victim. To measure CPU usage, we recorded the CPU usage on both Google Pixel phone and Nexus 5X phone by using Android adb shell. To evaluate the extra overhead incurred by system data-collection module, which requires a bit higher sampling rate than usual, we compared the CPU usage of an application running with a normal IMU sampling rate (for detecting screen rotation) and with the sampling rate which uses: 100 Hz. As shown in FIG. 16, albeit the increased sampling rate of the system, there were only small increases in the CPU usage; specifically, 2% increase on a Pixel phone and 3.4% increase on a Nexus 5X phone. Since such an increased CPU usage was also occasionally observable even when running with a normal sampling rate, the increased CPU usage may not necessarily indicate (or let the victim know) that the system is running.

Figure 17:
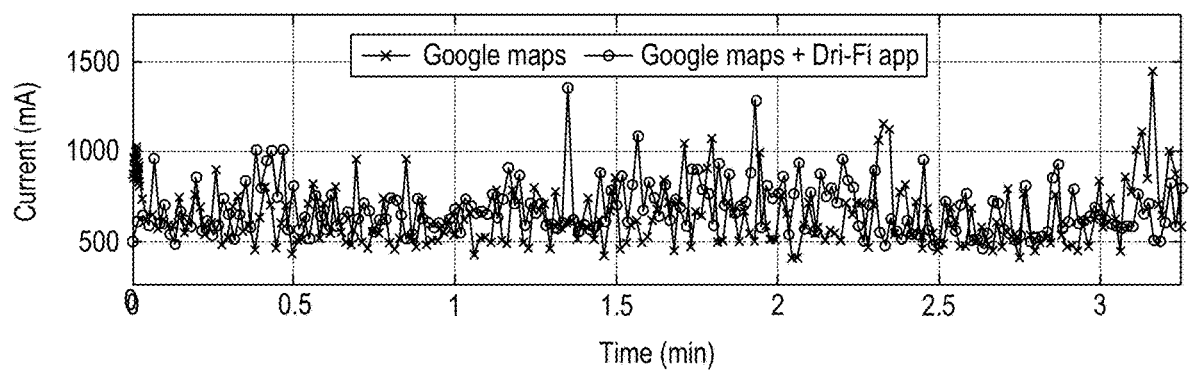
FIG. 17 is a graph showing energy consumption of the Dri-Fi system.

The additionally consumed energy of using the system was also examined by measuring the current drawn in the smartphones. FIG. 17 shows the energy consumption on Pixel while the Dri-Fi system was running in the background and utility applications (e.g. Google maps) were running in the foreground. The results indicate that compared to the case where Google maps drew 767.10 mA of current for navigation, Dri-Fi system drew only 49.60 mA additional current. This 6.5% extra energy consumption would be too minimal for the victim to notice.

Such small increases in CPU usage and energy consumption imply that if the compromised app/software originally has high overhead (e.g., navigation and social apps), then this marginal increase of these overhead caused by Dri-Fi system would be much less obvious. As a result, it will be even harder for the victim to notice such overheads.

An adversary exploiting this approach may require the IMU sensor data to be uploaded to his own server via the Internet. This requirement can be easily met with the vast number of IMU-equipped mobile devices that come with direct/indirect connectivities. Smartphones and OBD-II dongles (e.g., Samsung's Connect Auto dongle, Progressive's Snapshot) are the exemplary devices which have both IMUs and direct connectivity, i.e., a cellular module. Even though the device lacks direct connectivity, it may at least have some type of indirect connectivity, i.e., Internet access via connection to some gateway. As an example, for Internet access, IMU-equipped wearables can connect to a smartphone, which provides them the Internet access, via light-weighted protocols such as Bluetooth.

The fact that an adversary can accurately fingerprint the driver among such a number of candidates implies a serious potential privacy risk. In most real-world scenarios, the maximum number of drivers for a given vehicle may not even be as large twelve. As a result, regardless of the car/route, the adversary exploiting this system will likely identify the driver/victim within only one turn.

To prevent an adversary from fingerprinting the driver via an IMU, one may add noise to the sensor readings. Addition of noise does not necessarily have to be done continuously, but only when the driver is anticipated to start his turn. For example, as in FIG. 4, when the absolute gyroscope readings exceed the threshold, $\delta_{bump}$, the device can be configured to add noise. Accordingly, an adversary exploiting this system would be unable to extract accurate measurements from a vehicle turn and thus fail in driver fingerprinting. For smartphones, such an approach should be implemented in the OS-level, if there are no other apps using the IMU measurements for "good purposes" while driving. Another countermeasure (in case of a smartphone) is to request permission for use of IMU sensors when installing the app.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various computer systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for identifying a driver of a vehicle, comprising:

receiving, by a processor of a mobile device, a signal from a rotational rate sensor residing in the mobile device while the vehicle is being driven by a given driver, where the signals are indicative of angular speed about a yaw axis of the vehicle;

storing a plurality of fingerprints in a data store accessible to the processor, where each fingerprint in the plurality of fingerprints corresponds to a driver of the vehicle and is indicative of a turn made by the driver;

identifying, by the processor, a turn by the vehicle based on the received signal and a change in direction of travel by the vehicle;

extracting one or more features from the received signal and thereby forming a new fingerprint indicative of the turn made by the given driver, wherein the one or more features includes acceleration along an end-of turn axis during the turn as a first feature, a difference between successive acceleration values along the end-of-turn axis as a second feature and a difference between measurements from the rotational rate sensor during the turn as a third feature, where a start-of-turn axis is defined in direction the vehicle is travelling at the start of the turn and the end-of-turn axis is defined orthogonal to the start-of-turn axis;

comparing, by the processor, the new fingerprint to the plurality of fingerprints; and identifying the given driver of the vehicle based on the comparison of the new fingerprint to the plurality of fingerprints.

2. The method of claim 1 wherein identifying a turn by the vehicle includes monitoring a change in direction of travel by the vehicle; detecting a vehicle maneuver made by the vehicle from the received signal; identifying a turn by the vehicle based on the received signal and a change in direction of travel by the vehicle; and determining a start time and an end time for the identified turn in the received signal, where the vehicle maneuver is selected from a group consisting of a lane change, a turn, and a curvy road.

3. The method of claim 1 wherein extracting one or more features further includes segmenting the portion of the received signal into a fixed number of segments and, for each segment, determining the first feature, the second feature and the third feature from the corresponding segment of the received signal.

4. The method of claim 1 further comprises constructing a feature vector using the one or more extracted features and classifying the feature vector using a support vector machine.

5. The method of claim 1 further comprises logging identity of the given driver in the data store and transmitting the identity of the given driver via a wireless network to a recipient located remotely from the vehicle.

6. A method for identifying a driver of a vehicle, comprising:

receiving, by a processor of a mobile device, a signal from a rotational rate sensor residing in the mobile device while the vehicle is being driven by a given driver, where the signals are indicative of angular speed about a yaw axis of the vehicle;

storing a plurality of fingerprints in a data store accessible to the processor, where each fingerprint in the plurality of fingerprints corresponds to a driver of the vehicle and is indicative of a turn made by the driver;

monitoring, by the processor, a change in direction of travel by the vehicle;

detecting, by the processor, a vehicle maneuver made by the vehicle from the received signal;

identifying, by the processor, a turn by the vehicle based on the received signal and a change in direction of travel by the vehicle;

determining, by the processor, a start time and an end time for the identified turn in the received signal;

extracting one or more features using a portion of the received signal between the start time and the end time and thereby forming a new fingerprint indicative of the turn made by the given driver, wherein extracting one or more feature includes determining acceleration along an end-of-turn axis at multiple instances during the turn as a first feature, where a start-of-turn axis is defined in direction the vehicle is travelling at the start time of the turn and the end-of-turn axis is defined orthogonal to the start-of-turn axis;

comparing, by the processor, the new fingerprint to the plurality of fingerprints; and identifying the given driver of the vehicle based on the comparison of the new fingerprint to the plurality of fingerprints.

7. The method of claim 6 further comprises aligning a coordinate system for the mobile device with a geographic coordinate system, prior to the step of detecting a vehicle maneuver.

8. The method of claim 6 further comprises interpolating data in the received signals to a fixed length, prior to the step of detecting a vehicle maneuver.

9. The method of claim 6 further comprises detecting a vehicle maneuver in response to magnitude of the received signal exceeding a threshold.

10. The method of claim 6 wherein detecting a vehicle maneuver further comprises classifying the vehicle maneuver into one of three classes selected from a group consisting of a lane change, a turn and a curvy road.

11. The method of claim 6 wherein extracting one or more features further includes determining a difference between successive acceleration values along the end-of-turn axis as a second feature and determining a difference between measurements from the rotational rate sensor during the turn as a third feature.

12. The method of claim 11 wherein extracting one or more features further includes segmenting the portion of the received signal into a fixed number of segments and, for each segment, determining the first feature, the second feature and the third feature from the corresponding segment of the received signal.

13. The method of claim 6 further comprises constructing a feature vector using the one or more extracted features and classifying the feature vector using a support vector machine.

14. The method of claim 6 wherein the rotational rate sensor is further defined as one of a gyroscope and an accelerometer.

15. The method of claim 6 further comprises logging identity of the given driver in the data store and transmitting the identity of the given driver via a wireless network to a recipient located remotely from the vehicle.

16. A mobile device configured to identify a driver of a vehicle, comprising:

a rotational rate sensor residing in the mobile device and configured to generate a signal indicative of angular speed about a yaw axis of the vehicle while the vehicle is being driven by a given driver;

a data store that stores a plurality of fingerprints, where each fingerprint in the plurality of fingerprints corresponds to a particular driver of the vehicle and is indicative of a turn made by the particular driver;

a maneuver detector configured to receive the signal from the rotational rate sensor, wherein the maneuver detector detects a vehicle maneuver made by the vehicle from the received signal and classifies the vehicle maneuver into one of three classes selected from a group consisting of a lane change, a turn and a curvy road;

a feature extractor in data communication with the maneuver detector, the feature extractor determines a start time and an end time for a vehicle maneuver classified as a turn and extracts one or more features using a portion of the received signal between the start time and the end time, wherein extracting one or more feature includes determining acceleration along an end-of-turn axis during the turn as a first feature, where a start-of-turn axis is defined in direction the vehicle is travelling at the start time of the turn and the end-ofturn axis is defined orthogonal to the start-of-turn axis, thereby forming a new fingerprint indicative of the turn made by the given driver; and a driver identifier in data communication with the feature extractor and configured to receive the new fingerprint, the driver identifier compares the new fingerprint to the plurality of fingerprints and identifies the given driver of the vehicle based on the comparison of the new fingerprint to the plurality of fingerprints, wherein the maneuver detector, the feature extractor and the driver identifier are embodied as computer readable instructions stored on a non-transitory computer readable medium and perform processing of maneuver detector, the feature extractor and the driver identifier when executed by a computer processor of the mobile device.

17. The mobile device of claim 16 wherein the rotational rate sensor is further defined as one of a gyroscope and an accelerometer.

\* \* \* \* \*